United States Patent
Dean et al.

(10) Patent No.: US 10,013,536 B2
(45) Date of Patent: Jul. 3, 2018

(54) LICENSE ACTIVATION AND MANAGEMENT

(75) Inventors: Loren Dean, Natick, MA (US); Linda Cotter, Ashland, MA (US); Leslie Mehrez, Newton, MA (US); Gerard McElhinney, Foxborough, MA (US); John N. Little, Sherborn, MA (US)

(73) Assignee: The MathWorks, Inc., Natick, MA (US)

(*) Notice: Subject to any disclaimer, the term of this patent is extended or adjusted under 35 U.S.C. 154(b) by 1579 days.

(21) Appl. No.: 12/246,911

(22) Filed: Oct. 7, 2008

(65) Prior Publication Data

US 2009/0119779 A1  May 7, 2009

Related U.S. Application Data

(60) Provisional application No. 60/985,816, filed on Nov. 6, 2007.

(51) Int. Cl.
| | | |
|---|---|---|
| G06F 21/10 | (2013.01) | |
| G06F 21/00 | (2013.01) | |
| G06F 21/12 | (2013.01) | |
| G06F 9/445 | (2018.01) | |

(52) U.S. Cl.
CPC ............ G06F 21/105 (2013.01); G06F 21/00 (2013.01); G06F 21/12 (2013.01); G06F 21/128 (2013.01); G06F 9/445 (2013.01)

(58) Field of Classification Search
CPC ........ G06F 21/00; G06F 9/445; G06F 21/105; G06F 21/12; G06F 21/128
USPC .......................................................... 705/59
See application file for complete search history.

(56) References Cited

U.S. PATENT DOCUMENTS

| | | | | |
|---|---|---|---|---|
| 4,994,966 A | * | 2/1991 | Hutchins | G06F 17/274 704/9 |
| 5,199,066 A | * | 3/1993 | Logan | 726/29 |
| 5,479,639 A | * | 12/1995 | Ewertz et al. | 711/103 |
| 5,537,586 A | * | 7/1996 | Amram | G06F 17/30707 |
| 5,629,980 A | * | 5/1997 | Stefik et al. | 705/54 |
| 5,671,412 A | * | 9/1997 | Christiano | G06Q 30/04 |
| 5,724,425 A | * | 3/1998 | Chang et al. | 705/52 |
| 5,765,152 A | * | 6/1998 | Erickson | |
| 5,790,664 A | * | 8/1998 | Coley | G06F 21/10 709/203 |
| 5,819,260 A | * | 10/1998 | Lu | G06F 17/3061 707/700 |
| 5,892,900 A | * | 4/1999 | Ginter et al. | 726/26 |

(Continued)

OTHER PUBLICATIONS

White, Ron. "How Computers Work", Millenium Edition. Que Corporation. Sep. 1999.*

(Continued)

Primary Examiner — Mamon Obeid
(74) Attorney, Agent, or Firm — Harrity & Harrity, LLP

(57) ABSTRACT

A software license management system may include an activation server that provides permission to activate a software product. The activation server may receive receiving a request to validate activation of the software and refreshing license information for the software in response to the request to validate. The server may additionally receive a request to re-designate the license information for the software product and may update license information for the software in response to the request to re-designate the software product.

33 Claims, 29 Drawing Sheets

(56) References Cited

U.S. PATENT DOCUMENTS

| | | | | |
|---|---|---|---|---|
| 5,925,127 A * | 7/1999 | Ahmad | | 726/31 |
| 5,930,788 A * | 7/1999 | Wical | | G06F 17/30707 |
| 6,009,401 A * | 12/1999 | Horstmann | | 705/317 |
| 6,014,651 A * | 1/2000 | Crawford | | G06F 9/5061 |
| | | | | 705/34 |
| 6,044,469 A * | 3/2000 | Horstmann | | 726/29 |
| 6,044,471 A * | 3/2000 | Colvin | | 726/28 |
| 6,056,786 A * | 5/2000 | Rivera et al. | | 717/168 |
| 6,073,124 A * | 6/2000 | Krishnan et al. | | 705/59 |
| 6,119,108 A * | 9/2000 | Holmes et al. | | 705/40 |
| 6,144,991 A * | 11/2000 | England | | G06F 17/30873 |
| | | | | 707/E17.111 |
| 6,510,513 B1 * | 1/2003 | Danieli | | 713/156 |
| 6,714,975 B1 * | 3/2004 | Aggarwal | | G06Q 30/02 |
| | | | | 705/14.43 |
| 7,124,093 B1 * | 10/2006 | Graham | | G06Q 30/02 |
| | | | | 705/14.41 |
| 7,191,938 B2 * | 3/2007 | Pittroff | | G06K 17/0022 |
| | | | | 235/380 |
| 7,228,493 B2 * | 6/2007 | Kosak | | G06F 17/3089 |
| | | | | 707/E17.116 |
| 7,278,164 B2 * | 10/2007 | Raiz et al. | | 726/26 |
| 7,296,064 B2 * | 11/2007 | Yoon | | G06F 17/30029 |
| | | | | 375/E7.024 |
| 7,337,147 B2 * | 2/2008 | Chen et al. | | 705/59 |
| 7,343,297 B2 * | 3/2008 | Bergler et al. | | 705/59 |
| 7,346,606 B2 * | 3/2008 | Bharat | | G06Q 30/02 |
| 7,386,891 B2 * | 6/2008 | Peinado | | G06F 21/10 |
| | | | | 705/59 |
| 7,457,781 B1 * | 11/2008 | Weaver | | G06Q 20/367 |
| | | | | 455/405 |
| 7,505,940 B2 * | 3/2009 | Vijay et al. | | 705/59 |
| 7,631,318 B2 * | 12/2009 | Cottrille et al. | | 719/328 |
| 7,702,903 B1 * | 4/2010 | Roy | | G06F 21/105 |
| | | | | 380/231 |
| 7,703,142 B1 * | 4/2010 | Wilson | | G06F 21/105 |
| | | | | 380/59 |
| 7,725,721 B2 * | 5/2010 | Yellai | | G06F 21/10 |
| | | | | 380/279 |
| 7,752,138 B1 * | 7/2010 | Dean | | G06Q 30/06 |
| | | | | 705/50 |
| 7,752,140 B1 * | 7/2010 | Xu et al. | | 705/59 |
| 7,827,158 B2 * | 11/2010 | Hayakawa | | G06F 17/30648 |
| | | | | 707/688 |
| 7,865,444 B1 * | 1/2011 | Biswas | | G06F 21/105 |
| | | | | 705/51 |
| 7,891,007 B2 * | 2/2011 | Waxman et al. | | 726/27 |
| 7,987,194 B1 * | 7/2011 | Walker | | G06Q 30/0251 |
| | | | | 705/14.49 |
| 7,991,806 B2 * | 8/2011 | Broder | | G06Q 30/0241 |
| | | | | 705/14.4 |
| 8,150,679 B2 * | 4/2012 | Wick | | G06Q 10/107 |
| | | | | 704/8 |
| 8,156,002 B2 * | 4/2012 | van Zwol | | G06Q 30/02 |
| | | | | 705/14.41 |
| 8,225,300 B1 * | 7/2012 | Webb | | G06F 9/5027 |
| | | | | 717/149 |
| 8,229,858 B1 * | 7/2012 | Mazza | | G06F 21/10 |
| | | | | 705/51 |
| 8,275,709 B2 * | 9/2012 | Wang | | G06F 21/10 |
| | | | | 705/40 |
| 8,296,335 B2 * | 10/2012 | Bouve | | G06F 17/30241 |
| | | | | 705/14.4 |
| 8,311,997 B1 * | 11/2012 | Kauchak | | G06Q 30/02 |
| | | | | 707/705 |
| 8,326,686 B2 * | 12/2012 | Datar | | G06Q 30/02 |
| | | | | 705/14.49 |
| 8,412,650 B2 * | 4/2013 | Takamatsu | | G06F 17/2785 |
| | | | | 706/12 |
| 8,645,817 B1 * | 2/2014 | Fisher | | G06F 17/30867 |
| | | | | 715/243 |
| 8,726,278 B1 * | 5/2014 | Shawver | | G06F 9/4881 |
| | | | | 718/100 |
| 8,788,316 B1 * | 7/2014 | Karnik | | G06Q 30/0206 |
| | | | | 705/7.35 |
| 8,819,119 B2 * | 8/2014 | Stefansson | | G06F 9/44505 |
| | | | | 702/22 |
| 8,837,835 B1 * | 9/2014 | Samwel, III | | G06K 9/00483 |
| | | | | 382/192 |
| 8,850,607 B2 * | 9/2014 | Koka | | G06F 21/105 |
| | | | | 726/26 |
| 8,925,109 B2 * | 12/2014 | Agrawal | | H04L 63/123 |
| | | | | 726/29 |
| 9,003,541 B1 * | 4/2015 | Patidar | | G06F 21/121 |
| | | | | 713/159 |
| 9,117,219 B2 * | 8/2015 | Solomon | | G06Q 30/02 |
| 9,129,098 B2 * | 9/2015 | Indenbom | | G06F 21/128 |
| 9,740,836 B2 * | 8/2017 | Sugiura | | G06F 21/105 |
| 2001/0043364 A1 * | 11/2001 | Messner | | G06F 17/30867 |
| | | | | 358/1.15 |
| 2001/0049620 A1 * | 12/2001 | Blasko | | G06Q 10/10 |
| | | | | 705/14.53 |
| 2002/0010681 A1 * | 1/2002 | Hillegass | | G06F 21/10 |
| | | | | 705/59 |
| 2002/0042870 A1 * | 4/2002 | Rocray | | G06F 9/4405 |
| | | | | 712/10 |
| 2002/0046181 A1 * | 4/2002 | Story et al. | | 705/59 |
| 2002/0065857 A1 * | 5/2002 | Michalewicz | | G06F 17/3071 |
| | | | | 715/259 |
| 2002/0065958 A1 * | 5/2002 | Rocray | | G06F 9/4405 |
| | | | | 719/331 |
| 2002/0083123 A1 * | 6/2002 | Freedman | | H04L 29/06 |
| | | | | 709/203 |
| 2002/0107809 A1 * | 8/2002 | Biddle | | G06Q 10/10 |
| | | | | 705/59 |
| 2002/0129063 A1 * | 9/2002 | Kosak | | G06F 17/3089 |
| | | | | 715/234 |
| 2002/0138331 A1 * | 9/2002 | Hosea | | G06F 17/30905 |
| | | | | 705/7.37 |
| 2002/0164025 A1 * | 11/2002 | Raiz et al. | | 380/231 |
| 2002/0194010 A1 * | 12/2002 | Bergler et al. | | 705/1 |
| 2003/0061136 A1 * | 3/2003 | Inoue | | G06F 21/105 |
| | | | | 705/35 |
| 2003/0066884 A1 * | 4/2003 | Reddy | | G06F 21/10 |
| | | | | 235/382.5 |
| 2003/0088517 A1 * | 5/2003 | Medoff | | 705/59 |
| 2003/0101024 A1 * | 5/2003 | Adar | | G06F 17/30861 |
| | | | | 702/187 |
| 2003/0140311 A1 * | 7/2003 | Lemon | | G06F 17/3061 |
| | | | | 715/239 |
| 2004/0003269 A1 * | 1/2004 | Waxman et al. | | 713/193 |
| 2004/0039916 A1 * | 2/2004 | Aldis | | G06F 21/10 |
| | | | | 713/177 |
| 2004/0054589 A1 * | 3/2004 | Nicholas | | G06Q 30/02 |
| | | | | 705/14.52 |
| 2004/0059708 A1 * | 3/2004 | Dean | | G06Q 30/02 |
| 2005/0114198 A1 * | 5/2005 | Koningstein | | G06Q 30/02 |
| | | | | 705/14.42 |
| 2005/0120390 A1 * | 6/2005 | Nonoyama | | H04N 7/17318 |
| | | | | 725/135 |
| 2005/0132347 A1 * | 6/2005 | Harper | | G06F 21/105 |
| | | | | 717/168 |
| 2005/0262428 A1 * | 11/2005 | Little | | G06F 17/30867 |
| | | | | 715/201 |
| 2005/0289072 A1 * | 12/2005 | Sabharwal | | G06F 21/10 |
| | | | | 705/59 |
| 2006/0048236 A1 * | 3/2006 | Multerer et al. | | 726/28 |
| 2006/0059099 A1 * | 3/2006 | Ronning | | G06F 21/10 |
| | | | | 705/59 |
| 2006/0075224 A1 * | 4/2006 | Tao | | G06F 21/121 |
| | | | | 713/164 |
| 2006/0106728 A1 * | 5/2006 | Yellai | | G06F 21/105 |
| | | | | 705/59 |
| 2006/0200420 A1 * | 9/2006 | Osada | | G06F 21/10 |
| | | | | 705/59 |
| 2006/0242147 A1 * | 10/2006 | Gehrking | | G06F 17/30707 |

(56) References Cited

U.S. PATENT DOCUMENTS

| | | | | |
|---|---|---|---|---|
| 2006/0248017 A1* | 11/2006 | Koka | G06F 21/105 | 705/59 |
| 2006/0287920 A1* | 12/2006 | Perkins | G06Q 30/02 | 705/14.49 |
| 2007/0016469 A1* | 1/2007 | Bae | G06Q 30/02 | 705/14.54 |
| 2007/0033221 A1* | 2/2007 | Copperman | G06F 17/30616 | |
| 2007/0047817 A1* | 3/2007 | Abdulkader | G06K 9/00429 | 382/182 |
| 2007/0136817 A1* | 6/2007 | Nguyen | G06F 21/10 | 726/26 |
| 2007/0150294 A1* | 6/2007 | Rusnnan | G06F 21/10 | 705/59 |
| 2007/0208728 A1* | 9/2007 | Zhang | G06F 17/30702 | |
| 2007/0244823 A1* | 10/2007 | Motley | G06F 21/123 | 705/59 |
| 2007/0260741 A1* | 11/2007 | Bezancon | G06Q 10/087 | 709/230 |
| 2008/0028100 A1* | 1/2008 | Adelman | G06Q 10/107 | 709/245 |
| 2008/0101604 A1* | 5/2008 | Kocher | G11B 20/00086 | 380/210 |
| 2008/0195461 A1* | 8/2008 | Li | G06F 17/3089 | 705/14.6 |
| 2008/0208754 A1* | 8/2008 | Zunke | G06F 21/10 | 705/59 |
| 2008/0235085 A1* | 9/2008 | Kovinsky | G06Q 30/02 | 705/14.49 |
| 2008/0243683 A1* | 10/2008 | Patel | G06F 21/10 | 705/39 |
| 2008/0288341 A1* | 11/2008 | Garbe | G06Q 30/02 | 705/14.64 |
| 2008/0300971 A1* | 12/2008 | Zeng | G06Q 30/02 | 705/14.41 |
| 2009/0024718 A1* | 1/2009 | Anagnostopoulos | G06Q 30/02 | 709/218 |
| 2009/0055835 A1* | 2/2009 | Zhu | H04L 41/0896 | 718/105 |
| 2009/0092253 A1* | 4/2009 | Asipov | G06F 21/10 | 380/278 |
| 2009/0119218 A1* | 5/2009 | Ooki | G06F 21/105 | 705/59 |
| 2009/0119779 A1* | 5/2009 | Dean | G06F 21/105 | 726/26 |
| 2009/0132500 A1* | 5/2009 | Jones | G06F 17/30899 | |
| 2009/0228281 A1* | 9/2009 | Singleton | G10L 15/08 | 704/275 |
| 2009/0276208 A1* | 11/2009 | Pagan | G06F 17/274 | 704/9 |
| 2010/0121790 A1* | 5/2010 | Klinkott | G06F 17/30873 | 706/12 |
| 2010/0125502 A1* | 5/2010 | Solomon | G06Q 10/10 | 705/14.52 |
| 2010/0145808 A1* | 6/2010 | Hilbert | G06F 17/30867 | 705/14.66 |
| 2010/0161385 A1* | 6/2010 | Karypis | G06Q 10/04 | 705/7.31 |
| 2010/0191574 A1* | 7/2010 | Ziemann | G06Q 30/02 | 705/7.33 |
| 2010/0205303 A1* | 8/2010 | Chaturvedi | G06F 21/10 | 709/226 |
| 2010/0312469 A1* | 12/2010 | Chen | G01C 21/3608 | 701/408 |
| 2011/0055555 A1* | 3/2011 | Michaelis | G06F 21/10 | 713/156 |
| 2011/0086331 A1* | 4/2011 | Karov Zangvil | G09B 7/00 | 434/169 |
| 2011/0252378 A1* | 10/2011 | Anzures | G06F 3/04883 | 715/835 |
| 2012/0054053 A1* | 3/2012 | Cheek | G06Q 10/00 | 705/26.1 |
| 2012/0078715 A1* | 3/2012 | Li | G06F 17/30867 | 705/14.52 |
| 2012/0284119 A1* | 11/2012 | Hu | G06Q 30/0241 | 705/14.52 |
| 2012/0303446 A1* | 11/2012 | Busch | H04W 4/02 | 705/14.45 |
| 2013/0097166 A1* | 4/2013 | Fink | G06Q 30/02 | 707/737 |
| 2013/0125240 A1* | 5/2013 | Xu | H04L 63/12 | 726/26 |
| 2014/0013449 A1* | 1/2014 | Vijay | G06F 21/10 | 726/29 |
| 2014/0108145 A1* | 4/2014 | Patel | G06Q 30/0256 | 705/14.54 |
| 2014/0129211 A1* | 5/2014 | Kimelfeld | G06F 17/271 | 704/9 |
| 2014/0289515 A1* | 9/2014 | Sorotokin | G06F 21/10 | 713/162 |
| 2015/0363575 A1* | 12/2015 | Vlot | G06F 21/105 | 726/29 |
| 2016/0191540 A1* | 6/2016 | Fuka | H04L 63/107 | 726/4 |
| 2016/0203301 A1* | 7/2016 | Ooki | G06F 21/105 | 705/59 |
| 2016/0260127 A1* | 9/2016 | Bradley | G06T 11/60 | |

OTHER PUBLICATIONS

Notification of Transmittal of the International Search Report and the Written Opinion of the International Searching Authority, or the Declaration, corresponding to PCT/US 08/82192, dated Mar. 31, 2010, 9 pages.

Hassell, "Clearing up the confusion on Vista licensing and key management", 4 pages (2007).

Supplementary European Search report corresponding to EP 08 84 6253 dated Aug. 6, 2013, 5 pages.

* cited by examiner

FIG. 9

Company Account

Log in or create a company account

○ Log in to my company account — 910

E-mail address: [          ]

Password: [          ]

Forgot your password?

○ I need to create a company account — 920

[< Back] [Next >]        [Cancel]  [Help]   — 930

Account Creation

Create a company account

Provide the following information to create your company account. Your temporary password will be e-mailed to you. You can change your password and update other account details on the company web site. ← 1010

First name:

Last name:

E-mail address:

Activation key:

The activation key is used to identify your license. You may have received the activation key from the administrator of the license. ← 1020

[ < Back ]  [ Next > ]     [ Cancel ]   [ Help ]

License Center

[Export Table Data] [Associate Me with a License] ← 2010

| License No. | Label | Option | Use | Activation Type | My Role | Administrator |
|---|---|---|---|---|---|---|
| 12345 | Engineering | Group | Standard | Not Set | Administrator | Bob Jones |
| 34567 | Server | Concurrent | Standard | Network Concurrent User | Asset Manager | Phil Smith |
| 24680 | Lab | Individual | Standard | Designated Computer | Manager | Fred Rogers |

↑ 2020

Select a license to begin.

License Center

Export Table Data | Associate Me with a License

← 2010

↓ 2020

| License No. | Label | Option |
|---|---|---|
| 34567 | Server | Concurrent |
| 24680 | Lab | Individual |

License Details
License Attributes
Budget Area 1

Assign Products ← 2210
Select Products for Assignment

| | Products | Notes |
|---|---|---|
| ☑ | Software 1 | Pre-assigned |
| ☑ | Software 2 | |
| ☑ | Software 3 | |

[ Cancel ] [ Continue ]

↗ 2120

Assign

Products on License

| Count | | | | |
|---|---|---|---|---|
| 4 | | | | |
| 3 | Software 2 | 01 Jan 2008 | | 1 |
| 1 | Software 3 | 01 Jan 2010 | | 2 |

License Center

2300 →

2010 → [Export Table Data] [Associate Me with a License]

2020 →

| License No. | Label | Option |
|---|---|---|
| 34567 | Server | Concurrent |
| 24680 | Lab | Individual |

License Details
License Attributes

Budget Area 1

License File ← 2310

Set License File Expiration Date

An expiration date can be set on the License Files for this license. Once the License File expires, the software will no longer function.

○ Do not set an expiration date

○ Set the License File to expire on:

Month: [01 January ▼]

Year: [2009 ▼]

[Continue]

Products on License

| Count | | | |
|---|---|---|---|
| 4 | | Software 2 | 01 Jan 2008 |
| 3 | | Software 3 | 01 Jan 2010 |
| 1 | | | |

← 2120

[Assign]

License Center

Export Table Data    Associate Me with a License

← 2010

↙ 2020

| License No. | Label | Option | Use | Activation Type | My Role | Administrator |
|---|---|---|---|---|---|---|
| 34567 | Server | Concurrent | Standard | Concurrent User | Asset Manager | Phil Smith |
| 24680 | Lab | Individual | Standard | Desig. Computer | Manager | Fred Rogers |

Manage Users and License Contacts

↙ 2510

License End Users

E-mail Users | Add User | Remove User | Set User Permissions

| First Name | Last Name | E-mail | Can Download? | Can Activate? |
|---|---|---|---|---|
| Charlie | Brown | cbrown@example.com | Allowed | Allowed |
| John | Smith | jsmith@example.com | Allowed | Allowed |

↙ 2520

License Contacts

Edit License Contacts

| First Name | Last Name | E-mail | Role | Department |
|---|---|---|---|---|
| Joe | Blue | jblue@example.com | Asset Manager | Development |
| Fred | Jones | fjones@example.com | Administrator | Development |

← 2500

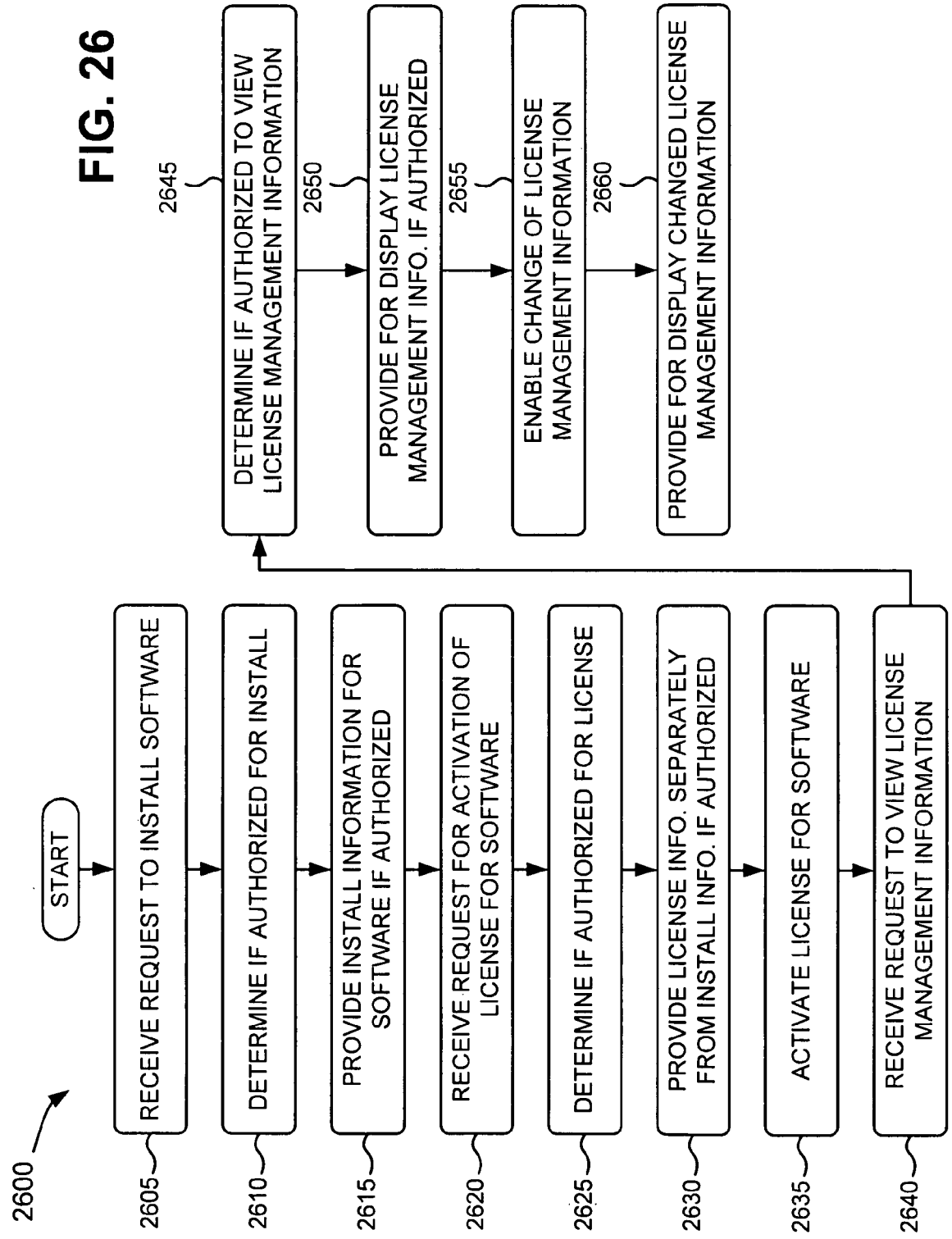

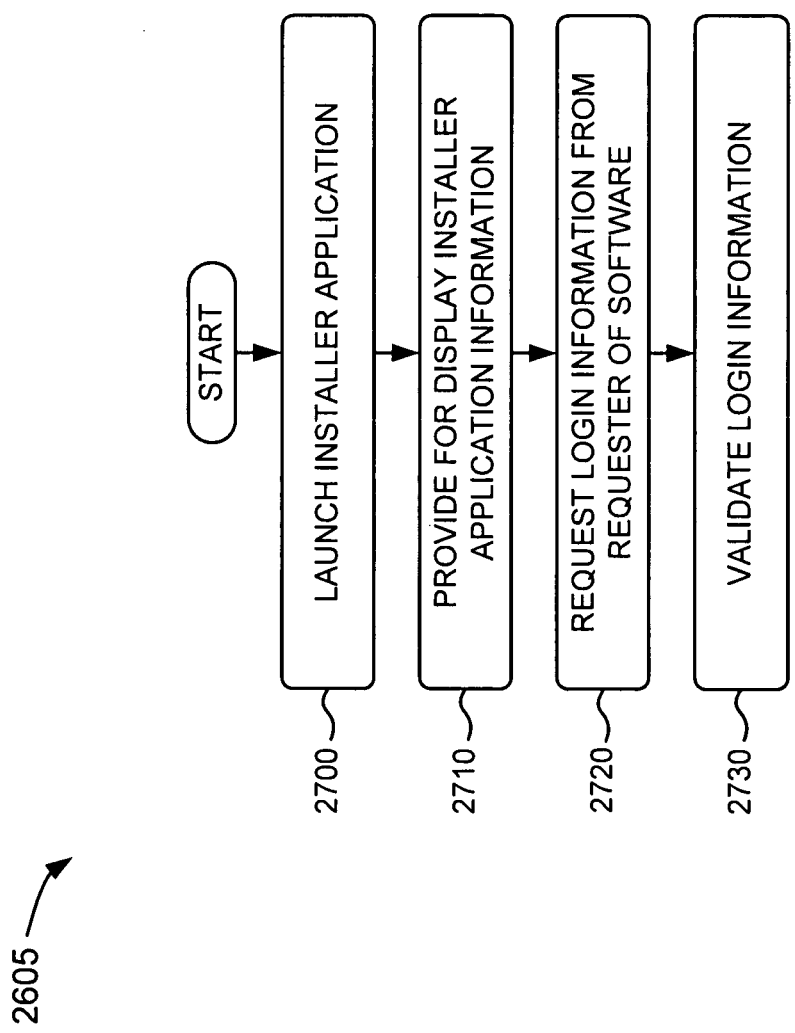

US 10,013,536 B2

LICENSE ACTIVATION AND MANAGEMENT

PRIORITY INFORMATION

The present application claims priority to U.S. Provisional Patent Application No. 60/985,816, filed Nov. 6, 2007, the entire contents of which are hereby incorporated by reference.

BACKGROUND

Administration of software (e.g., computer programs, music, videos, images, documents, etc.) licenses is a difficult task because different companies provide different software licensing rights. For example, some companies provide software licensing rights that may allow a person to install a single piece of software only on one device. Such companies typically use term licenses or perpetual licenses that lock an end user into a release. Other companies may provide licensing rights to a hierarchy of software products, and may allow installation of the software products on one device for use by many people or on multiple devices for use by one person. Such companies typically use perpetual licenses that permit an end user to have multiple releases of the software products to manage.

It can be difficult for an administrator to manage software installed on multiple machines or that has varying usage rights or has varying product lists. For example, a group license may make the license portable, but it may require the administrator to track the license using a spreadsheet or database. Tracking a license may involve knowing who is using the license, understanding where the license is installed, and knowing what software products are covered by the license. The administrator must also attempt to comply with the license agreement which may only allow software covered by the license to change up to a number of times a year.

Proper tracking of an activation of software may help address high rates of software piracy. However, the difficulty in administration and management of software licenses only encourages such software piracy.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 7-25 depict exemplary user interfaces capable of being provided by the license server of the network illustrated in FIG. 1; and FIGS. 26-29 depict flow charts related to an exemplary process according to implementations described herein.

DETAILED DESCRIPTION

Figure 1:
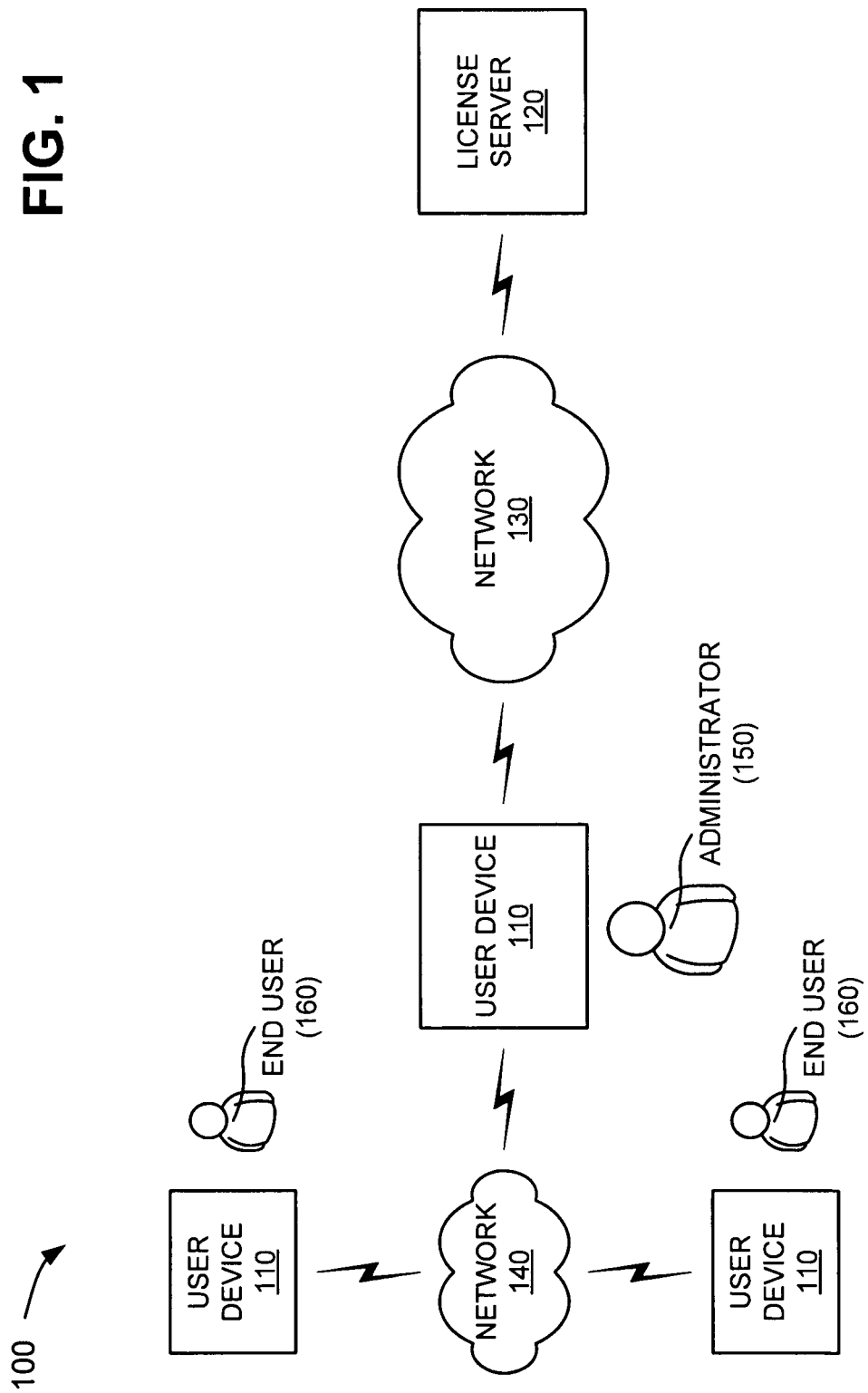
FIG. 1 is an exemplary diagram of a network in which systems and methods described herein may be implemented.

The following detailed description refers to the accompanying drawings. The same reference numbers in different drawings may identify the same or similar elements. Also, the following detailed description does not limit the invention.

Overview

Implementations described herein may include systems and/or methods that provide a license activation and/or management application (hereinafter referred to as "license application" or "license activation/management application") for one or more software products. For example, the license application may activate, deactivate, transfer, validate, designate, re-designate, etc. one or more licenses associated with the one or more software products. In one implementation, the license application may receive a request to install software, may determine if a requester of the software install is authorized for the software, and may provide installation information for the software if the software requester is authorized. The license application may receive a request for activation of a license for the software, may determine if a requester of the license is authorized, may provide license information, separately from the software installation information, if the license requester is authorized, and may activate the license for the software. The license application may receive a request to view license management information, may determine if a requester of the license management information is authorized, and may provide for display of the license management information if the requester is authorized. The license application may enable the license management information to be changed, and may provide for display of the changed license management information.

In exemplary implementations, the license application may provide the software to a customer, but may not license the software until later. Alternatively and/or additionally, the license application may provide multiple software products (e.g., a family of software products) to the customer's user device(s) (e.g., computers), but may only activate the software products for which the customer purchased a license. Activation may permit a supplier of the software to monitor compliance with license counts, and may permit the software supplier to reassign license rights among a customer's user devices. The customer may access the license application to administer the customer's license(s) (e.g., the customer can move a license from one user device to another, set expiration dates for the license(s), add or remove licensed users of the software, deactivate user devices, etc.).

"Software" or "software product," as the terms are used herein, are to be broadly interpreted to include any electronic media that is capable of being licensed. For example, software/software product may include a software application, a computer program, digital information (e.g., music, videos, images, documents, electronic newspapers, electronic books, electronic magazines, online encyclopedias, audio files, web casts, podcasts, etc.), etc. that is capable of being licensed. In an exemplary implementation, a software/ software product may include a technical computing environment (TCE).

A "technical computing environment (TCE)," as the term is used herein, is to be broadly interpreted to include any hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the end user to develop code in a conventional programming language, such as C++, C, Fortran, Pascal, etc. In one implementation, a TCE may include a dynamically-typed programming language (e.g., the MATLAB® M language) that can be used to express problems and/or solutions in mathematical notations. For example, a TCE may use an array as a basic element, where the array may not require dimensioning. In addition, a TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A TCE may further provide mathematical functions and/or graphical tools (e.g., for creating plots, surfaces, images, volumetric representations, etc.). In one implementation, a TCE may provide these functions and/or tools using toolboxes (e.g., toolboxes for signal processing, image processing, data plotting, parallel programming, etc.). In another implementation, a TCE may provide these functions as block sets. In still another implementation, a TCE may provide these functions in another way, such as via a library, etc.

A TCE may be implemented as a text-based environment (e.g., MATLAB® software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink® environment, Stateflow® environment, SimEvents™ environment, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

Exemplary Network Configuration

FIG. 1 is an exemplary diagram of a network 100 in which systems and methods described herein may be implemented. As illustrated, network 100 may include user devices 110 and/or a license server 120 interconnected by networks 130 and 140. User devices 110 and/or license server 120 may connect to networks 130 and 140 via wired and/or wireless connections. Three user devices, a single license server, and two networks have been illustrated in FIG. 1 for simplicity. In practice, there may be more or less user devices, license servers, and/or networks. Also, in some instances, one or more of user devices 110 and/or license server 120 may perform one or more functions described as being performed by another one or more of user devices 110 and/or license server 120. As further shown in FIG. 1, one user device 110 may be associated with an administrator (e.g., a software licensing administrator, a network administrator, a network manager, etc.), and two user devices 110 may be associated with end users 160 (e.g., users of software provided by license server 120, customers of an organization associated with the software provided by license server 120, etc.).

Each user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, a workstation, or other types of computation or communication devices, threads or processes running on these devices, and/or objects executable by these devices. In one implementation, user device 110 associated with administrator 150 may include any device that is capable of accessing a software application or a web-based application (e.g., provided by license server 120) that enables administrator 150 to manage, monitor, maintain, display, etc. one or more licenses associated with any software provided by license server 120 to user devices 110 associated with end users 160.

License server 120 may include one or more server entities, or other types of computation or communication devices, that gather, process, search, and/or provide information in a manner described herein. In one implementation, license server 120 may provide a software application or a web-based application (e.g., a license application) that activates, deactivates, transfers, validates, designates, re-designates, etc. one or more licenses associated with the one or more software products. License server 120 may also provide software (other than license application) to user devices 110 associated with end users 160. In other implementations, one or more devices (not shown) other than license server 120 may provide any software (other than license application) to user devices 110 associated with end users 160. For example, an organization may be associated with (e.g., own, control, operate, etc.) license server 120 as well as one or more servers that may provide software (other than license application) to user devices 110 associated with end users 160.

In an exemplary implementation, license server 120 may provide the license application as a web service. A "web service," as the term is used herein, is to be broadly interpreted to include any software application that allows machine-to-machine communications over a network (e.g., a local area network (LAN), a metropolitan area network (MAN), a wide area network (WAN), such as the Internet, etc.). For example, a web service may communicate with a client (e.g., another device) using an application program interface (API) that the client may access over the network. The web service may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications, such as web service definition language (WSDL) and/or proprietary specifications.

In one example, a web service may allow a destination (e.g., a computer operated by a customer) to manage, activate, validate, etc. licenses using hardware and/or software that may be operated by a service provider. In another example, the customer may receive the web service on a subscription basis. A subscription may include substantially any type of arrangement, such as monthly subscription, a per-use fee, a fee based on an amount of information exchanged between the service provider and the customer, etc. Further details of license server 120 are provided below in connection with FIGS. 3-25.

Network 130 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, or a combination of networks.

Network 140 may include a LAN, a WAN, a MAN, an intranet, the Internet, a PLMN, a telephone network, such as the PSTN or a cellular telephone network, or a combination of networks. In one implementation, network 140 may include a LAN that interconnects user devices 110 associated with end users 160 and user device 110 associated with administrator 150.

Administrator 150 may include any person (e.g., of an organization) responsible for managing, monitoring, maintaining, etc. software licenses provided by license server 120. For example, in one implementation, administrator 150 may include a network administrator, a network engineer, a network technician, etc. Administrator 150 may be permitted to download software from license server 120, activate software via license server 120, install software received from licenser server 120, receive license related emails from license server 120, and manage end user 160. If there are multiple administrators 150, an asset manager may be provided to oversee the multiple administrators 150. The asset manager may provide a layer of hierarchy and may have the same privileges as administrator 150. Administrator 150 may add and/or remove end users associated with a license. In other implementations, administrator 150 may include a device or administrator station (e.g., a computing device, a workstation, a personal computer, a laptop, etc.).

End user 160 may include any person (e.g., of an organization) that executes or attempts to execute software provided by license server 120. If end user 160 is a stand-alone named user, end user may be permitted to download software from license server 120, activate software via license server 120, install software received from licenser server 120, and execute software received from license server 120.

Exemplary User Device and License Server Configuration

Figure 2:
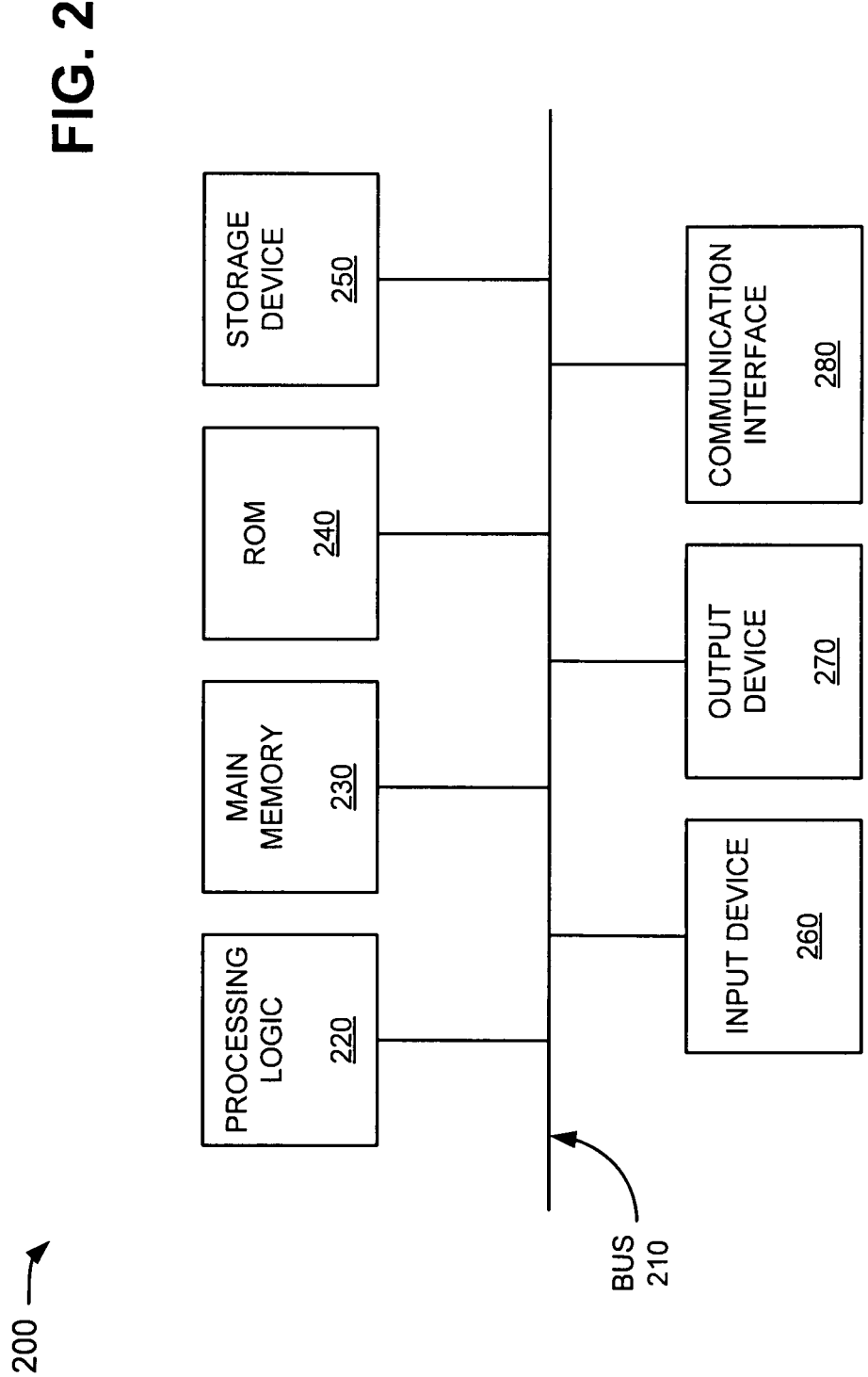
FIG. 2 illustrates exemplary components of a user device and/or a license server of the network depicted in FIG. 1.

FIG. 2 is an exemplary diagram of a device 200 that may correspond to user device 110 and/or license server 120. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as networks 130 or 140.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Exemplary User Devices/License Server Interactions

Figure 3:
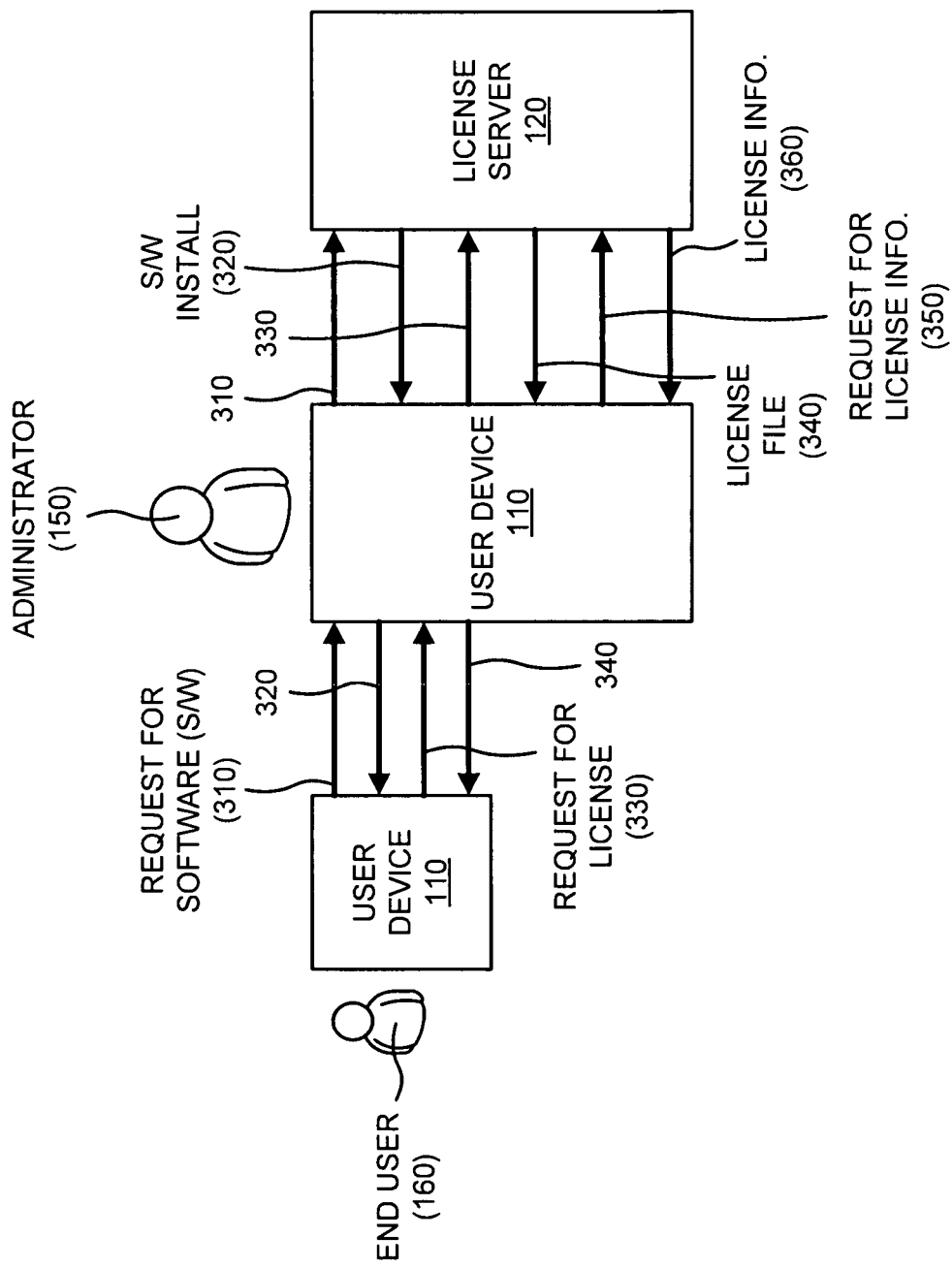
FIG. 3 depicts exemplary interactions between two user devices and the license server of the network illustrated in FIG. 1.

FIG. 3 depicts a portion 300 of network 100 (that includes user device 110 associated with end user 160, user device 110 associated with administrator 150, and license server 120), and exemplary interactions between user devices 110 and license server 120. As illustrated, end user 160 (e.g., via his/her user device 110) may send a request for software 310 to user device 110 associated with administrator 150, and administrator 150 (e.g., via his/her user device 110) may forward software request 310 to license server 120. License server 120 may receive software request 310, may determine if end user 160 is authorized to install the requested software, and, if end user 160 is authorized, may provide software installation information 320 to user device 110 associated with administrator 150. User device 110 associated with administrator 150 may forward software installation information 320 to user device 110 associated with end user 160. End user 160 may install the software on his/her user device 110, but may not be able to execute the software until a license associated with the software is activated.

As further shown in FIG. 3, end user 160 (e.g., via user device 110) may send a request 330 for activation of a license (e.g., associated with the software) to user device 110 associated with administrator 150, and administrator 150 may (e.g., via his/her user device 110) forward license activation request 330 to license server 120. License server 120 may receive license activation request 330, may determine if end user 160 is authorized to activate the license associated with the software, and, if end user 160 is authorized, may provide a license file 340 (e.g., locked to a host identifier associated with licenser server 120) to user device 110 associated with administrator 150. License file 340 may be provided separately from software installation information 320. Administrator 150 (e.g., via his/her user device 110) may forward license file 340 to user device 110 associated with end user 110. License server 120 may activate the license for the software, and user device 110 associated with end user 160 may execute the software.

As further illustrated in FIG. 3, administrator 150 (e.g., via his/her user device 110) may send a request 350 to view license management information to license server 120. License server 120 may receive request 350, may determine if administrator 150 is authorized to view the license management information, and, if administrator 150 is authorized, may provide for display (e.g., to user device 110 associated with administrator 150) the license management information, as indicated by reference number 360. License server 120 may enable administrator 150 to review, edit, change, etc. information associated with licenses for which administrator 150 is responsible. For example, license server 120 may enable administrator 150 to change license management information 360, and may provide for display (e.g., to user device 110 associated with administrator 150) the changed license management information.

Although FIG. 3 shows exemplary components of network portion 300, in other implementations, network portion 300 may contain fewer, different, or additional components than depicted in FIG. 3. In still other implementations, one or more components of network portion 300 may perform one or more other tasks described as being performed by one or more other components of network portion 300. For example, although not shown in FIG. 3, user device 110 associated with end user 160 may directly access license server 120 to receive software installation information 320 and/or license file 340, without having to send request through user device 110 associated with administrator 150.

Exemplary License Server Configuration

Figure 4:
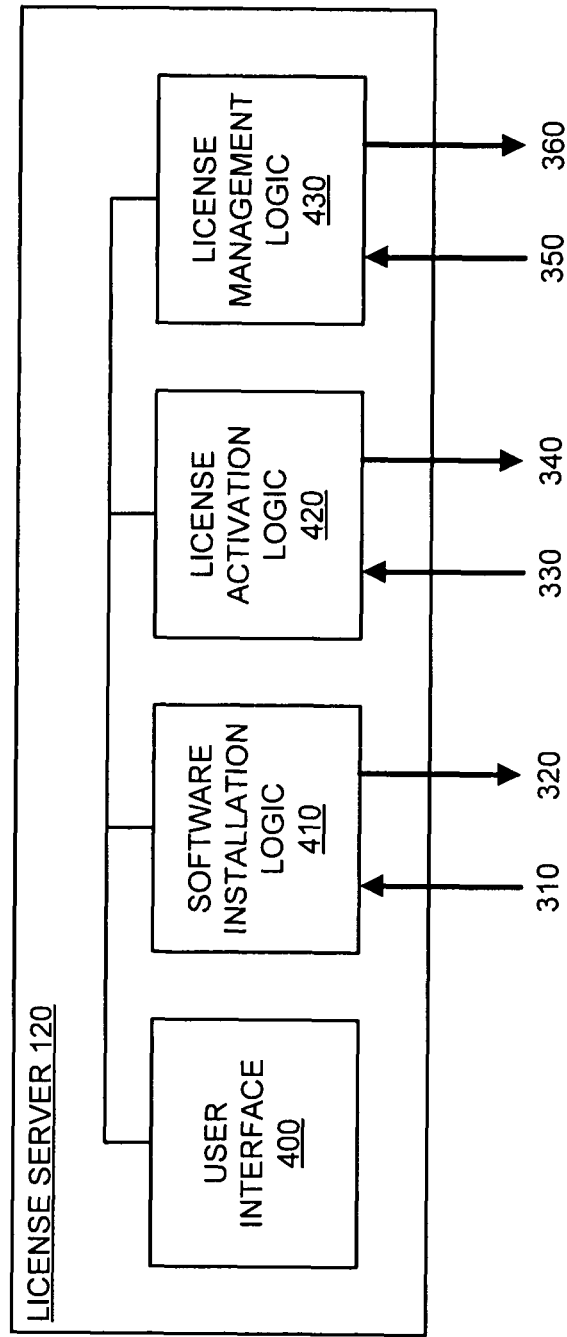
FIG. 4 depicts exemplary components of the license server of the network illustrated in FIG. 1.

FIG. 4 depicts exemplary components of license server 120. As illustrated, license server 120 may include a user interface 400, software installation logic 410, license activation logic 420, and license management logic 430.

User interface 400 may include a graphical user interface (GUI) or a non-graphical user interface, such as a text-based interface. User interface 400 may provide information to users (e.g., end users, administrators, etc.) via a customized interface (e.g., a proprietary interface) and/or other types of interfaces (e.g., a browser-based interface). User interface 400 may receive user inputs via one or more input devices (e.g., input device 260), may be user configurable (e.g., a user may change the size of user interface 400, information displayed in user interface 400, color schemes used by user interface 400, positions of text, images, icons, windows, etc., in user interface 400, etc.), and/or may not be user configurable. User interface 400 may be displayed to a user via one or more output devices (e.g., output device 270).

Software installation logic 410 may include any hardware and/or software based logic (e.g., processing logic 220) that enables license server 120 to install software on customer devices (e.g., user devices 110 associated with end users 160). For example, software installation logic 410 may receive software request 310 (e.g., from user device 110 associated with end user 160), may determine if end user 160 is authorized to install the requested software, and, if end user 160 is authorized, may provide software installation information 320 to user device 110 associated with end user 160. Further details of user interfaces associated with software installation are provided below in connection with FIGS. 7-14.

License activation logic 420 may include any hardware and/or software based logic (e.g., processing logic 220) that enables license server 120 to activate licenses for software installed on customer devices (e.g., user devices 110 associated with end users 160). For example, license activation logic 420 may receive license activation request 330 (e.g., from user device 110 associated with end user 160), may determine if end user 160 is authorized to activate the license associated with the software, and, if end user 160 is authorized, may provide license file 340 (e.g., locked to a host identifier associated with licenser server 120) to user device 110 associated with end user 160. Further details of user of user interfaces associated with license activation are provided below in connection with FIGS. 15-18.

In online activation, a device that has software that needs to be activated may be attached to a network (e.g., network 130) connected to license server 120, and may provide information (e.g., a host identifier) to license server 120 (e.g., license activation logic). License activation logic 420 may return license file 340 (e.g., locked to the host identifier). In offline activation, a device (e.g., a computer in a secure lab) that has software that needs to be activated may not be attached to a network (e.g., network 130) connected to license server 120. In this situation, license server 120 may be accessed, via another device connected to license server 120, so that license file 340 may be retrieved. The end user may provide license file 340 to the offline device. For example, a client proxy may be connected to license server 120 (e.g., via a network) and may include a device that may perform the registration process on behalf of a client device not connected to license server 120 (e.g., via a network).

License activation logic 420 may provide a variety of license options, such as a concurrent license (e.g., a network license that requires contacting a license manager to use the software), a network named user license (e.g., requires contacting a license manager to use the software), an individual license (e.g., does not require a license manager), and/or a group license (e.g., does not requires a license manager). For concurrent licenses and network named user licenses, license activation logic 420 may automate license activation and may permit administrators (e.g., administrator 150) to access an on-line license administration and management center. For individual licenses, license activation logic 420 may provide activation types for selection (e.g., which may be defined at a time of purchase of the software, at a time of activation of the software, or by the administrator), such as a designated device type and a standalone named user type. A designated device type individual license may be locked to device (e.g., user device 110) information, may provide a single activation per license, and may enable a single user of the software at a time. A standalone named user type individual license may be locked to device (e.g., user device 110) and user (e.g., end user 160) information, may provide multiple activations per license, and may require end user association. Group licenses may include group member licenses that are created for each user (e.g., end user 160) and designated device (e.g., user device 110), and may be activated in a manner similar to individual licenses. In contrast to current group licenses which require separate group license tracking (e.g., via a spreadsheet, database, etc.), license server 120 may enable group licenses to be viewed, managed, tracked, modified, etc. via an interactive license management center. This may provide a deterrent to unauthorized use of software products, may provide consistent licensing rules across platforms, and may provide centralized access to licensing information (e.g., for software license allocation and tracking, self serve re-designation, and end user management).

Figure 5:
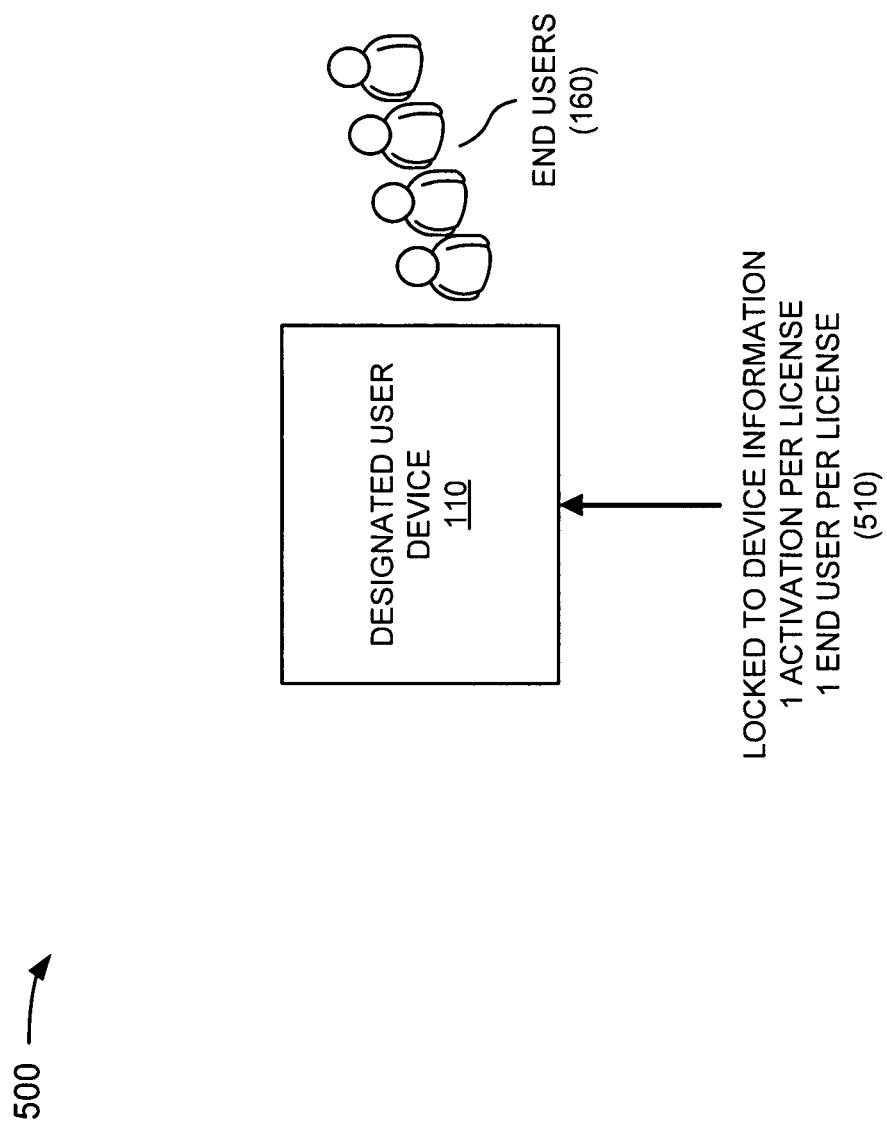
FIG. 5 illustrates an exemplary software licensing arrangement capable of being provided by the license server of the network illustrated in FIG. 1.

FIG. 5 illustrates an exemplary software licensing arrangement 500 (e.g., a designated device type individual license) capable of being provided by license server 120. As illustrated, arrangement 500 may include a designated user device 110 and multiple end users 160. Designated user device 110 may receive a designated device type individual license that may be locked to device (e.g., designated user device 110) and user (e.g., end users 160) information, may provide a single activation per license, and may enable a single user (e.g., one of end users 160) of the software at a time, as indicated by reference number 510.

Figure 6:
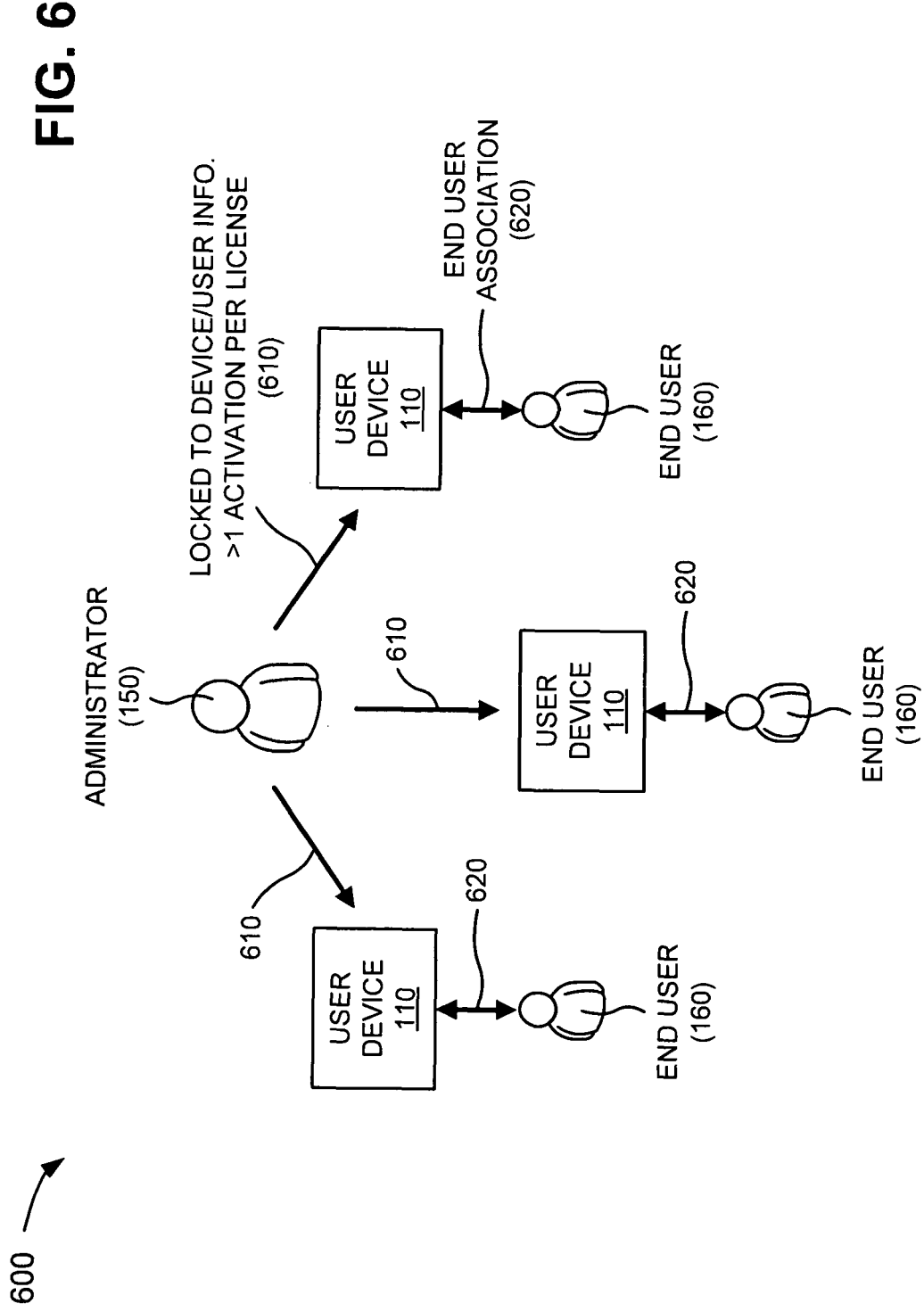
FIG. 6 illustrates another exemplary software licensing arrangement capable of being provided by the license server of the network illustrated in FIG. 1.

FIG. 6 illustrates another exemplary software licensing arrangement 600 (e.g., a standalone named user type individual license) capable of being provided by license server 120. As illustrated, arrangement 600 may include administrator, multiple user devices 110, and associated end users 160. Administrator 150 may receive a standalone named user type individual license that may be locked to device (e.g., user devices 110) and user (e.g., end users 160) information, may provide multiple activations per license, as indicated by activations 610 provided to user devices 110, and may require end user association, as indicated by reference number 620.

License activation logic 420 may provide a group member license that may provide a single license for each software product. For example, if an administrator has five software products, the administrator may receive five group member licenses. A group member license may be similar to an individual license, and may provide a license number to an administrator. Software products may be assigned to the license number.

License activation logic 420 may control generation and activation of licenses using license files (e.g., license file 340) that may be provided to end users. License activation logic 420 may limit a number of license files that are generated, and may determine how the license files are locked and used. The activation provided by license activation logic 420 may limit a number of times an end user can use software (e.g., may permit an end user to reinstall software four times). In contrast, conventional concurrent license configurations require an end user to provide host identification (e.g., that is for a license manager to execute at a user site) for a concurrent license, and the license/software provider locks their software to the host identification. Current standalone license configurations require the license/software provider to provide the end user with a Personal License Password (PLP) (e.g., a string of digits that identify license rights of the end user) that may be difficult or impossible to monitor when used inappropriately.

The PLP does not separate software installation from licensing because the PLP tells an installer what software products to install and tells an encrypter for which software products to create a license. This approach may encourage software piracy because the software may be installed on any number of devices with the PLP. In contrast, as shown in FIG. 4, license server 120, via license activation, may separate software installation from software licensing. With activation, license server 120 may install one or more software products on one or more user devices 110, however, the one or more software products may not execute until they are activated. This may separate software installation from software activation (or licensing). Software installation logic 410 may provide a key for software installation (e.g., a file installation key) via software installation information 320, and license activation logic 420 may, separately, provide a key for software activation (e.g., an activation key or license file 340). License file 340 may act as an "association key" that may associate the software with a valid license, and may be stored locally (e.g., on user device 110 associated with end user 160).

License activation logic 420 may use an activation count to indicate if further license activation of software is available. In one example, the activation count may include an integer that may be set to a value and decremented as activations are used. If the activation count reaches zero, no more activations are available. A designated device type individual license may include an activation count of "1" when initialized. If a device is activated, the activation count may be decremented to zero.

License management logic 430 may include any hardware and/or software based logic (e.g., processing logic 220) that enables license server 120 to provide license management information (e.g., via a license center) to licensees (e.g., administrator 150, end users 160) so that the licensees may manage, review, edit, modify, etc. their license information. For example, license management logic 430 may receive request 350 to view license management information (e.g., from administrator 150), may determine if administrator 150 is authorized to view the license management information, and, if administrator 150 is authorized, may provide for display (e.g., to user device 110 associated with administrator 150) the license management information, as indicated by reference number 360. License management logic 430 may enable administrator 150 to change license management information 360, and may provide for display (e.g., to user device 110 associated with administrator 150) the changed license management information. Further details of user interfaces associated with license information and the license center are provided below in connection with FIGS. 19-25.

License management logic 430 may enable license server 120 to validate licensing configurations. For example, license management logic 430 may enable administrators to use the license center to either manually mark devices to be deactivated, or to use re-designations to automatically notify a user device that a change (e.g., software product change, expiration date change, end user change, device deactivation, etc.) has occurred with a license. Validation may be enabled or disabled by the administrators (e.g., via the license center). If disabled, an administrator may still manually deactivate devices.

License management logic 430 may employ a set of rules for managing licenses. For example, in one implementation, license management logic 430 may employ re-designation rules, deactivation rules, and validation rules. Re-designation may include changing an existing setting associated with a license, and may include various types. A first type of re-designation, a device to device re-designation, may include moving software from one device to another device. A second type of re-designation, a user re-designation, may include re-designating an end user on a stand-alone end user license (e.g., one user may no longer use the software because a new user is authorized). A third type of re-designation, a product re-designation, may include changing a mix of software products on a license. A fourth type of re-designation, an activation re-designation, may include switching from a designated device license to a stand-alone named user license and vice versa. In other implementations, basically any setting on a license has the ability to be re-designated following the application of some rules.

License management logic 430 may also include two facets. First, each kind of re-designation may include rules related to validation. The basic concept may be that all relevant activations are validating and those that are not validating are returned. Assuming this criterion is met, licensing management logic 430 may go to the next set of rules, which is to verify that re-designation is even allowed. For example, license management logic 430 may generally allow up to four re-designations per year. License management logic 430 may look back over the past "365" days and may determine if four re-designations occurred. License management logic 430 may review re-designations of the same type occurring when it does this check but it may review any kind of re-designation that occurred. Assuming license management logic 430 is allowed to do the re-designation then user interface 400 may be enabled for the administrator to make the change. Finally, rules may restrict product re-designations across entitlements of like type (i.e., between group members) but that restriction may be a business rule. License management logic 430 may permit these to be allowed between any two licenses (entitlements).

Deactivation may include disabling software on a device by invalidating (or turning off) a license. There may be two ways to deactivate software. First, the software may be initialized and deactivated from a help menu associated with the software. If the device with the software is connected to license server 120, the activation count may be incremented by one by license server 120. If the device with the software is not connected to license server 120, a string may be generated on the device that may be provided to license server 120 (e.g., via another device). License server 120 may use the string to identify the device with the software and to increment the activation count by one. A second way to deactivate software is through validation. Deactivation may involve two things. First, deactivating a software client side and then returning the activation. Deactivating the software client side can occur either manually or automatically. Manual deactivation may be accomplished via a menu. Automatic deactivation may be accomplished either with license file expiration dates or when the software has been marked to be deactivated in the license center by the administrator and a validation check or refresh rights check occurs. If deactivation occurs then backend systems may need to be updated in one of four ways (e.g., automatically when the user manually does the deactivation, manually by entering the deactivation string when the user did the deactivation, manually through a form on the license center that says the device is no longer available, and/or the administrator can mark the activation as deactivated if the validation rules are met for the given kind of re-designation the administrator wants to accomplish).

Validation may include verifying that a user device has a legitimate copy of software. Validation may be enabled or disabled by a customer. If validation is enabled, at a defined time period (e.g., a number of days, weeks, months, etc.), the customer's device may contact license server 120, and license server 120 may validate the software contained on the customer's device. If a validation takes place, a refresh rights operation may occur. The refresh rights operation may determine if anything has changed from the license, and if something has changed, the change (e.g., a change in an expiration date of the license) may be provided to the customer's device. Alternatively, license server 120 may email the customer about the change in the license. In one implementation, if the customer executes the software associated with the license, the software may automatically access license server 120 and license server 120 may automatically update the rights of the software. Thus, validation may provide automatic license file updates.

Although FIG. 4 shows exemplary components of license server 120, in other implementations, license server 120 may contain fewer, different, or additional components than depicted in FIG. 4. In still other implementations, one or more components of license server 120 may perform one or more other tasks described as being performed by one or more other components of license server 120. For example, license server 120 may allow for automatic administration of licenses. This may occur if somebody tries to install and/or activate against a previously-activated license. License server 120 may check to see the validation status and automatically perform the administrator's job of doing the re-designation. This scenario may occur with larger group licenses. Instead of having to provide an activation key for a specific license, the administrator could provide an activation key for the group license. That key may instruct license server 120 to look for an "available" license based upon the validation and/or re-designation rules.

Exemplary User Interfaces

FIGS. 7-25 depict exemplary user interfaces 700-2500 that may be provided by license server 120 (e.g., via user interface 400). In one implementation, FIGS. 7-14 may display a variety of software installation related user interfaces 700-1400 capable of being provided by the license application of license server 120 (e.g., to one of user devices 110). FIGS. 15-18 may display a variety of license activation related user interfaces 1500-1800 capable of being provided by the license application of license server 120 (e.g., to one of user devices 110). FIGS. 19-25 may display a variety of license management related user interfaces 1900-2500 capable of being provided by the license application of license server 120 (e.g., to one of user devices 110).

Software Installation User Interfaces

Figure 7:
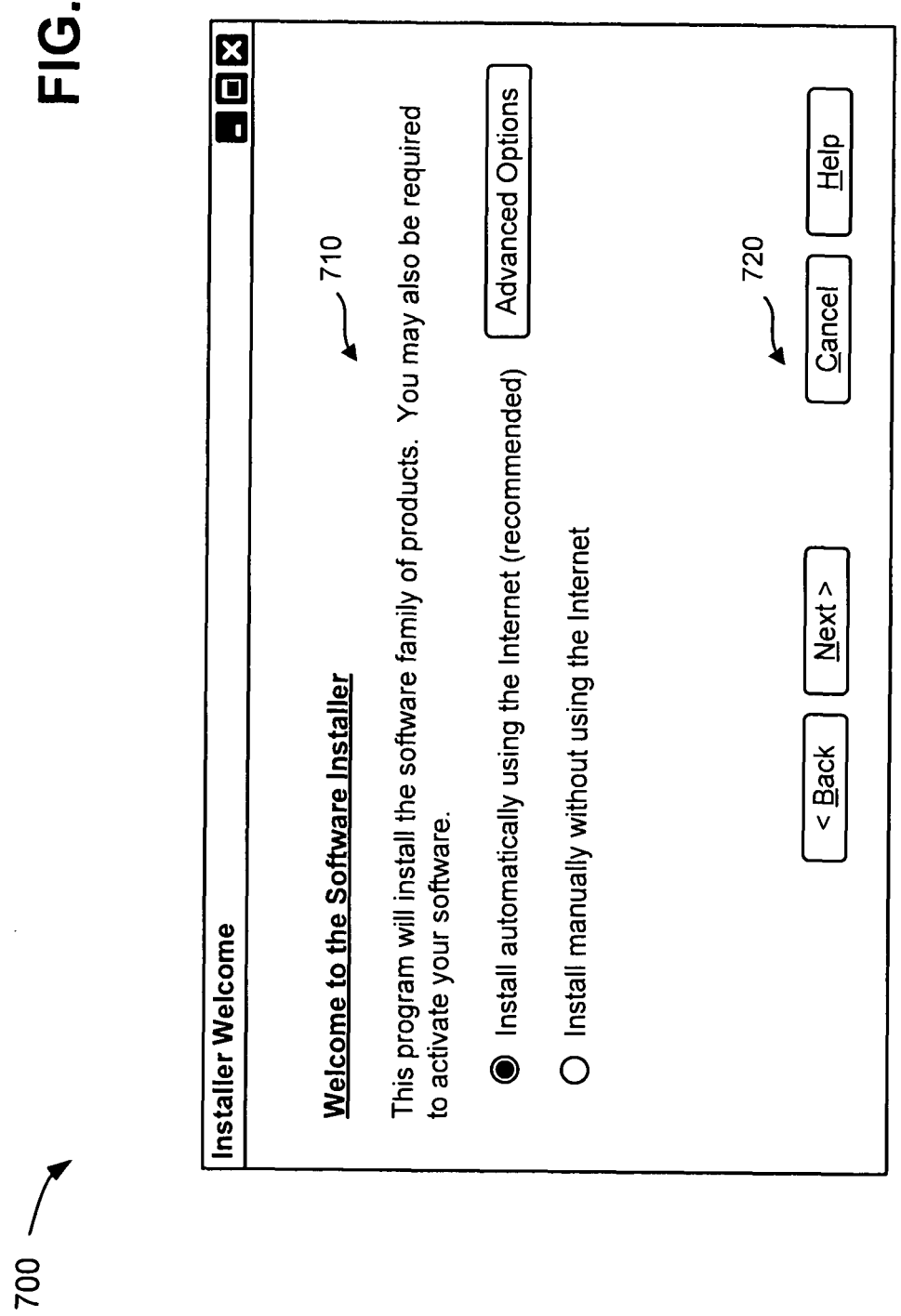

If an end user wishes to install software (e.g., via user device 110) provided by license server 120, the end user may send a software request (e.g., software request 310) to license server 120, and user interface 700, as shown in FIG. 7, may be displayed to the end user. As illustrated, a user interface 700 may include a variety of information associated with software installation. In one implementation, user interface 700 may include software installer information and installation options 710, and various navigation mechanisms 720.

Software installation information/installation options 710 may include software installation information (e.g., "This program will install the software family of products. You may also be required to activate your software."), and installation options (e.g., "Install automatically" or "Install manually"). A mechanism (e.g., a button selector mechanism, a drop-down menu, etc.) may enable an end user to selection one of the installation options.

Navigation mechanisms 720 may include mechanisms (e.g., buttons, icons, links, etc.) that may enable an end user of the software installation application to navigate through the software installation process. For example, in one implementation, navigation mechanisms 720 may include a "Back" button (e.g., for returning to a previous user interface), a "Next" button (e.g., for moving to a next user interface), a "Cancel" button (e.g., for cancelling the software installation), and/or a "Help" button (e.g., for providing help information associated with the software installation).

Although FIG. 7 shows exemplary elements of user interface 700, in other implementations, user interface 700 may contain fewer, different, or additional elements than depicted in FIG. 7.

Figure 8:
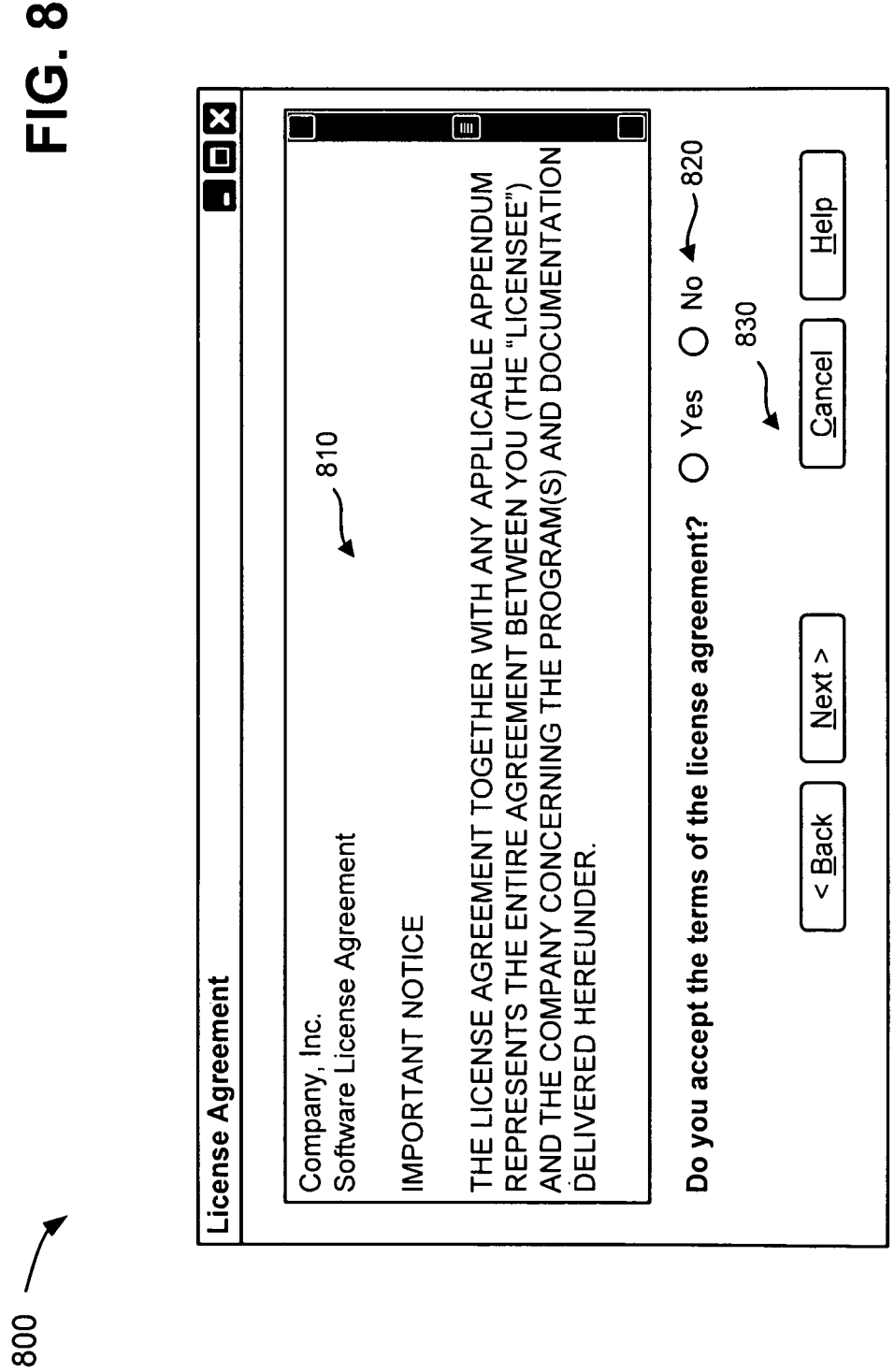

If an end user selects "Install automatically" and the "Next" button provided in user interface 700 (e.g., via user device 110), a user interface 800, as shown in FIG. 8, may be displayed to the end user. As illustrated, user interface 800 may include a variety of information (e.g., a license agreement), such as license agreement information 810, a term acceptance mechanism 820, and/or various navigation mechanisms 830.

License agreement information 810 may include software licensing agreement terms (e.g., duration, expirations, software product information, etc.) associated with the software the end user is attempting to install.

Term acceptance mechanism 820 may provide a selection mechanism (e.g., a button, a drop-down menu, etc.) from which the end user may accept or not accept the terms of the software license agreement set forth in license agreement information 810.

Navigation mechanisms 830 may include mechanisms (e.g., buttons, icons, links, etc.) that may enable an end user of the software installation application to navigate through the software installation process. For example, in one implementation, navigation mechanisms 830 may include a "Back" button (e.g., for returning to a previous user interface), a "Next" button (e.g., for moving to a next user interface), a "Cancel" button (e.g., for cancelling the software installation), and/or a "Help" button (e.g., for providing help information associated with the software installation).

Although FIG. 8 shows exemplary elements of user interface 800, in other implementations, user interface 800 may contain fewer, different, or additional elements than depicted in FIG. 8.

If an end user accepts the terms of the software license agreement (e.g., via term acceptance mechanism 820) and the "Next" button provided in user interface 800 (e.g., via user device 110), a user interface 900, as shown in FIG. 9, may be displayed to the end user. As illustrated, user interface 900 may include a variety of information (e.g., company account information) associated with the company providing the software (e.g., via license server 120), such as a login section 910, a create account section 920, and/or various navigation mechanisms 930.

Login section 910 may enable the end user to log into a company account associated with the software provided by license server 120. For example, login section 910 may include an input field for an e-mail address, and an input field for a password to verify that the end user has an authorized company account.

Create account section 920 may enable the end user to create a company account with the company associated with the software provided by license server 120. For example, if the end user selects "I need to create a company account," a user interface may be displayed to the end user that provides information for creating the company account.

Navigation mechanisms 930 may include mechanisms (e.g., buttons, icons, links, etc.) that may enable an end user of the software installation application to navigate through the software installation process. For example, in one implementation, navigation mechanisms 930 may include a "Back" button (e.g., for returning to a previous user interface), a "Next" button (e.g., for moving to a next user interface), a "Cancel" button (e.g., for cancelling the software installation), and/or a "Help" button (e.g., for providing help information associated with the software installation).

Although FIG. 9 shows exemplary elements of user interface 900, in other implementations, user interface 900 may contain fewer, different, or additional elements than depicted in FIG. 9.

If the end user selects create account section 920 and selects the "Next" button provided in user interface 900 (e.g., via user device 110), a user interface 1000, as shown in FIG. 10, may be displayed to the end user. As illustrated, user interface 1000 may include a variety of information (e.g., account creation information) for creating a company account, such as an account information section 1010 and various navigation mechanisms 1020.

Account information section 1010 may request information from the end user for creating a company account. For example, account information section 1010 may provide an input field for a first name of the end user, an input field for a last name of the end user, an input field for an e-mail address of the end user, and/or an input field for an activation key (e.g., a unique code or identifier that may be used to identify a license of the end user, and may be received from an administrator of the license).

Navigation mechanisms 1020 may include mechanisms (e.g., buttons, icons, links, etc.) that may enable an end user of the software installation application to navigate through the software installation process. For example, in one implementation, navigation mechanisms 1020 may include a "Back" button (e.g., for returning to a previous user interface), a "Next" button (e.g., for moving to a next user interface), a "Cancel" button (e.g., for cancelling the software installation), and/or a "Help" button (e.g., for providing help information associated with the software installation).

Although FIG. 10 shows exemplary elements of user interface 1000, in other implementations, user interface 1000 may contain fewer, different, or additional elements than depicted in FIG. 10.

Figure 11:
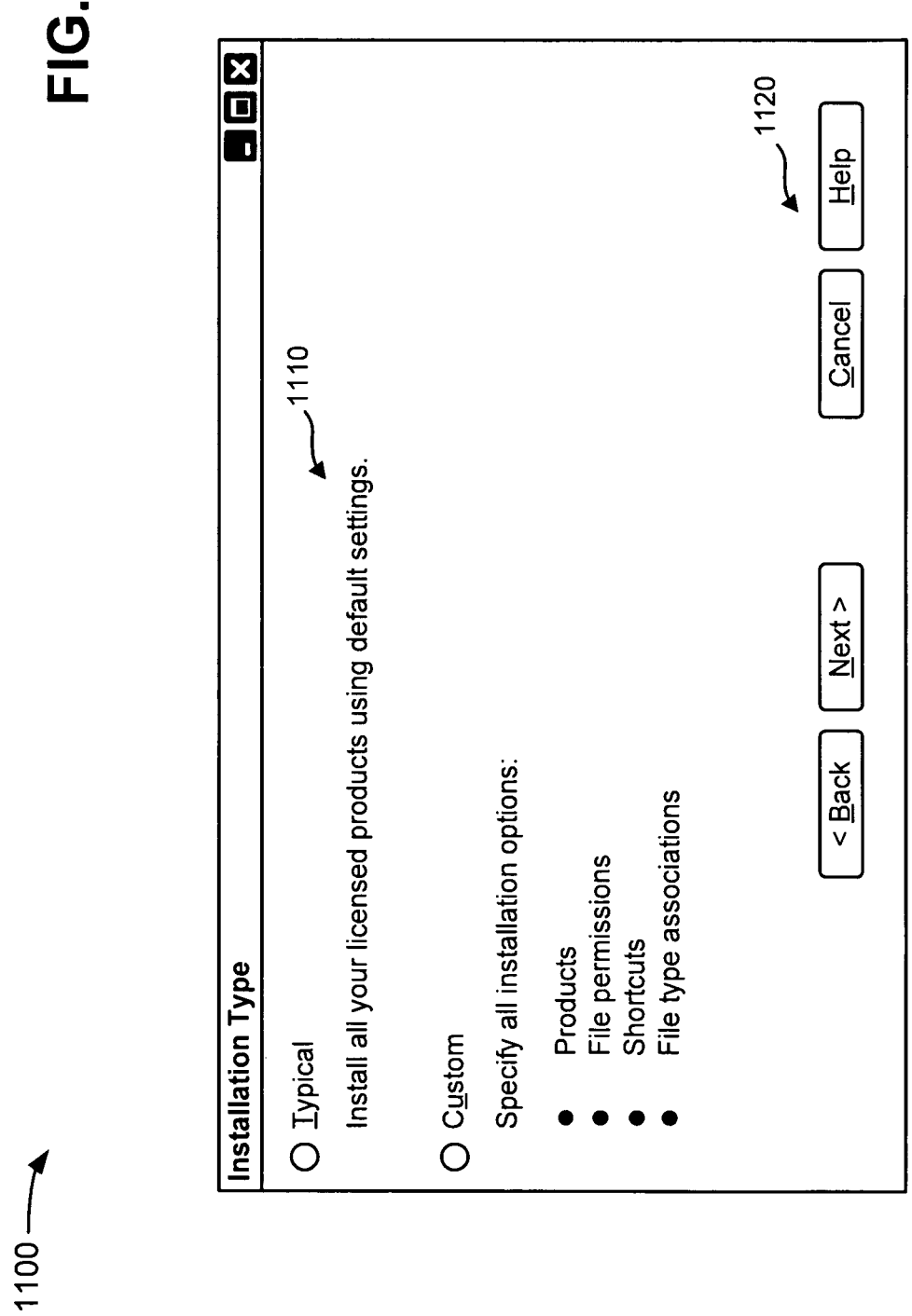

If an end user logs into the company account (or creates a company account) and selects the "Next" button provided in user interface 1000 (e.g., via user device 110), a user interface 1100, as shown in FIG. 11, may be displayed to the end user. As illustrated, user interface 1100 may include a variety of information (e.g., installation type information), such as an installation type selection section 1110, and various navigation mechanisms 1120.

Installation type selection section 1110 may provide the end user with a choice of software installation types for selection. For example, installation type selection section 1110 may include a choice of a typical installation (e.g., "Install all your licensed products using default settings.") and a custom installation (e.g., "Specify all installation options," such as "Products," "File Permissions," "Shortcuts," and "File type associations").

Navigation mechanisms 1120 may include mechanisms (e.g., buttons, icons, links, etc.) that may enable an end user of the software installation application to navigate through the software installation process. For example, in one implementation, navigation mechanisms 1120 may include a "Back" button (e.g., for returning to a previous user interface), a "Next" button (e.g., for moving to a next user interface), a "Cancel" button (e.g., for cancelling the software installation), and/or a "Help" button (e.g., for providing help information associated with the software installation).

Although FIG. 11 shows exemplary elements of user interface 1100, in other implementations, user interface 1100 may contain fewer, different, or additional elements than depicted in FIG. 11.

Figure 12:
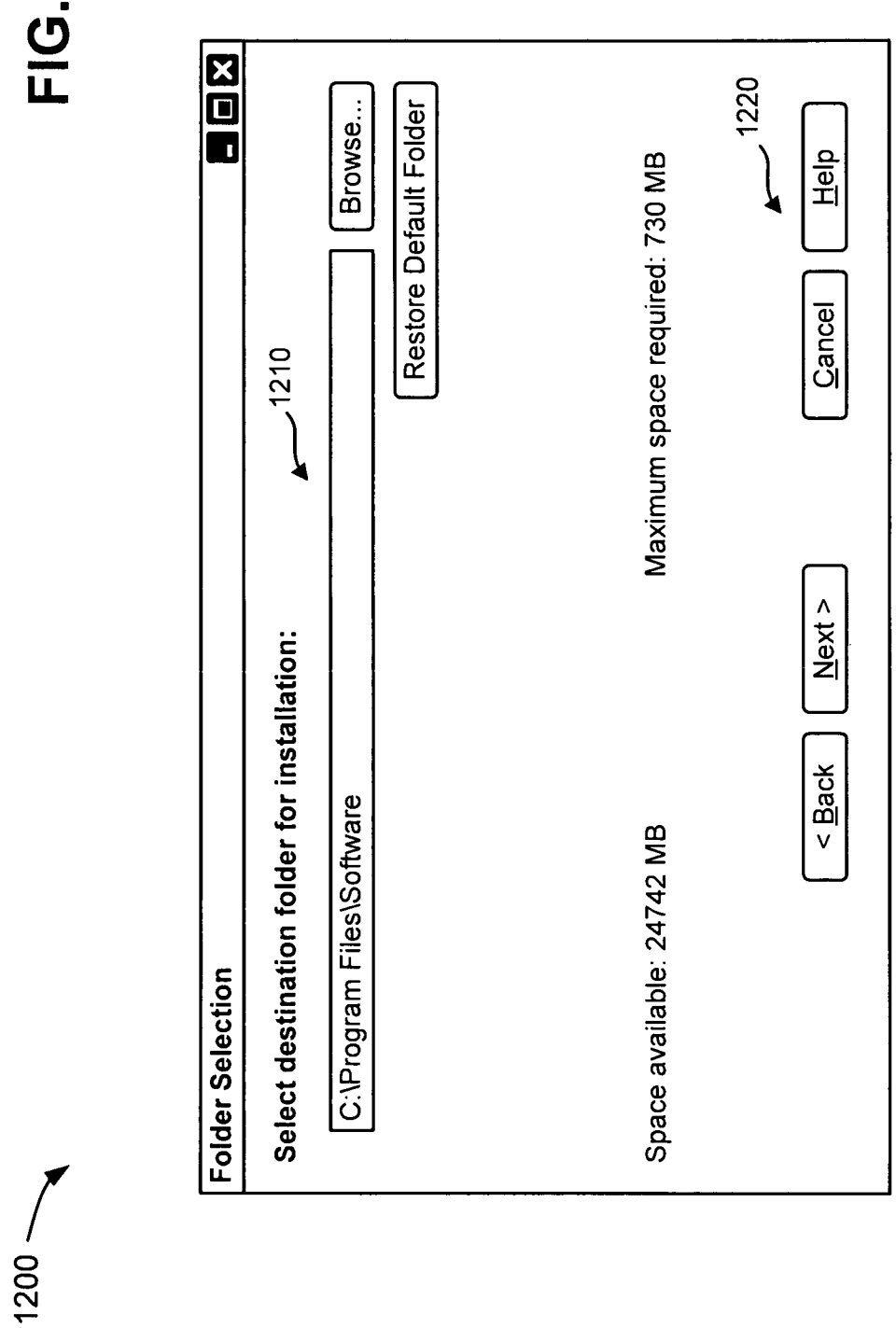

If an end user selects an installation and selects "Next" button provided in user interface 1100 (e.g., via user device 110), a user interface 1200, as shown in FIG. 12, may be displayed to the end user. As illustrated, user interface 1200 may include a variety of information (e.g., folder selection information), such as destination folder information 1210, and various navigation mechanisms 1220.

Destination folder information 1210 may include an input field for the end user to input a destination folder (e.g., on user device 110) for installation of the software selected by the end user. Destination folder information 1210 may enable the end user to browse folders of user device 110 and/or may provide a default folder of user device 110. Destination folder information 1210 may provide available memory space (e.g., on user device 110) and/or required memory space for the software to enable the end user determine if there is sufficient space for the software.

Navigation mechanisms 1220 may include mechanisms (e.g., buttons, icons, links, etc.) that may enable an end user of the software installation application to navigate through the software installation process. For example, in one implementation, navigation mechanisms 1220 may include a "Back" button (e.g., for returning to a previous user interface), a "Next" button (e.g., for moving to a next user interface), a "Cancel" button (e.g., for cancelling the software installation), and/or a "Help" button (e.g., for providing help information associated with the software installation).

Although FIG. 12 shows exemplary elements of user interface 1200, in other implementations, user interface 1200 may contain fewer, different, or additional elements than depicted in FIG. 12.

Figure 13:
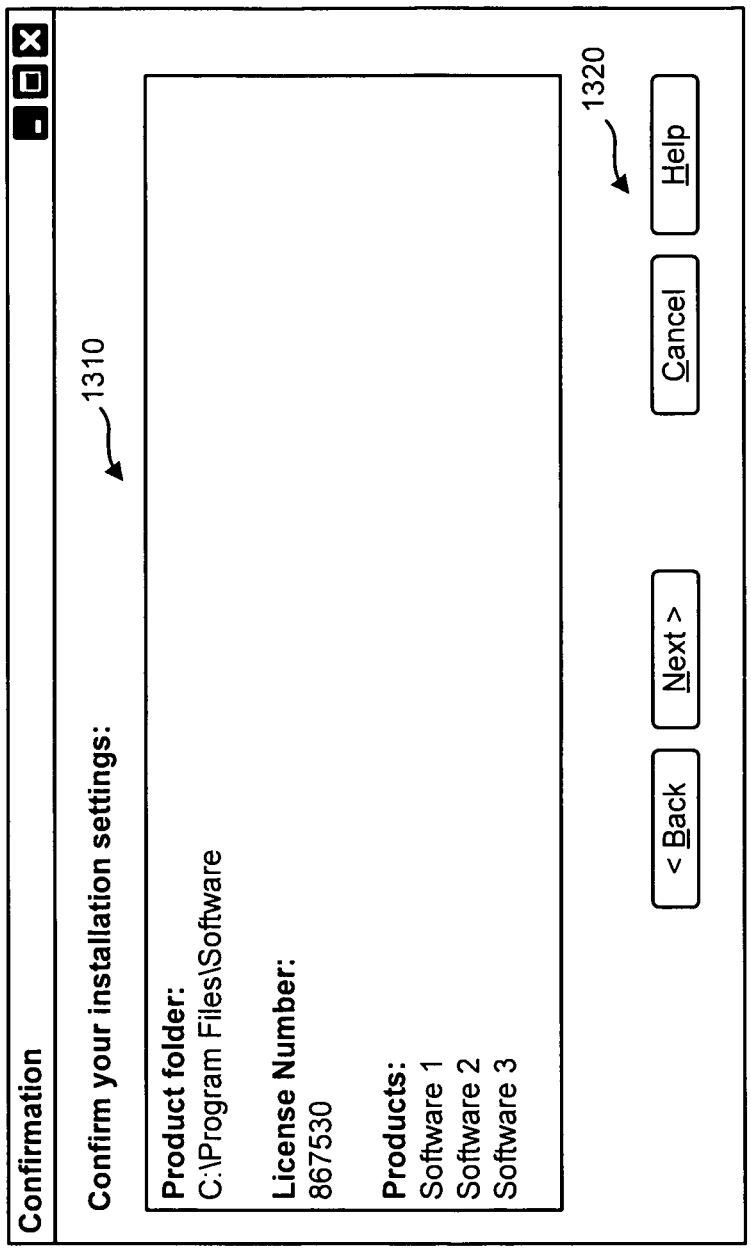

If an end user selects the destination folder for installation and selects the "Next" button provided in user interface 1200 (e.g., via user device 110), a user interface 1300, as shown in FIG. 13, may be displayed to the end user. As illustrated, user interface 1300 may include a variety of information (e.g., confirmation information), such as an installation settings section 1310, and various navigation mechanisms 1320.

Installation settings section 1310 may provide software installation settings information for the end user to confirm. For example, installation settings section 1310 may provide product folder information (e.g., "C:\Program Files\Software"), a license number for the software (e.g., "867530"), and/or software product information (e.g., "Software 1," "Software 2," and "Software 3").

Navigation mechanisms 1320 may include mechanisms (e.g., buttons, icons, links, etc.) that may enable an end user of the software installation application to navigate through the software installation process. For example, in one implementation, navigation mechanisms 1320 may include a "Back" button (e.g., for returning to a previous user interface), a "Next" button (e.g., for moving to a next user interface), a "Cancel" button (e.g., for cancelling the software installation), and/or a "Help" button (e.g., for providing help information associated with the software installation).

Although FIG. 13 shows exemplary elements of user interface 1300, in other implementations, user interface 1300 may contain fewer, different, or additional elements than depicted in FIG. 13.

Figure 14:
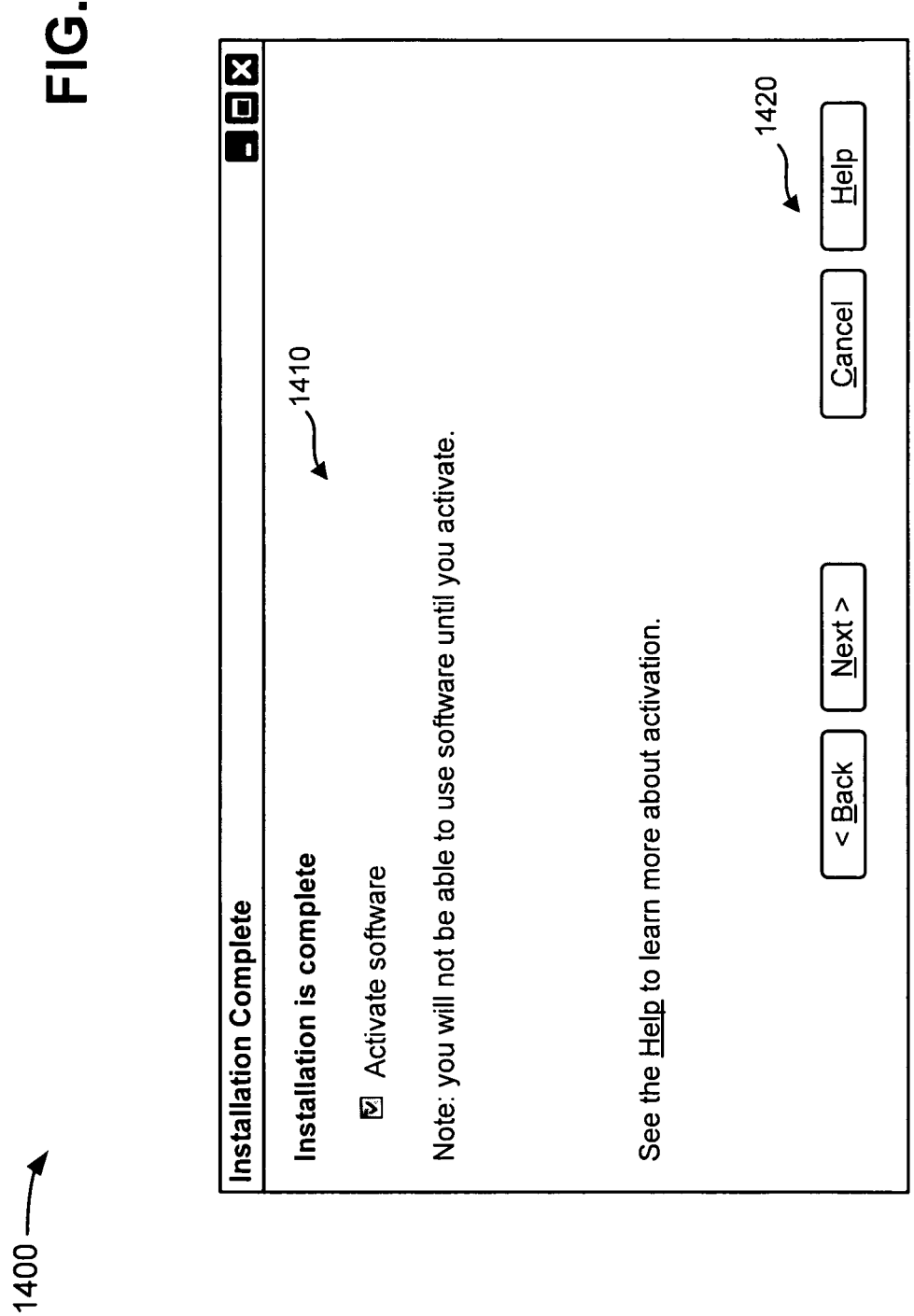

If an end user selects the "Next" button provided in user interface 1300 (e.g., via user device 110), a user interface 1400, as shown in FIG. 14, may be displayed to the end user. As illustrated, user interface 1400 may include a variety of information (e.g., installation complete information), such as an activation section 1410, and various navigation mechanisms 1420.

Activation section 1410 may notify the end user that the software installation is complete, and may provide the end user with a mechanism (e.g., a check box) to select if the end user wishes to activate the software. Activation section 1410 may also provide a note regarding the software (e.g., "Note: you will not be able to use software until you activate.").

Navigation mechanisms 1420 may include mechanisms (e.g., buttons, icons, links, etc.) that may enable an end user of the software installation application to navigate through the software installation process. For example, in one implementation, navigation mechanisms 1420 may include a "Back" button (e.g., for returning to a previous user interface), a "Next" button (e.g., for moving to a next user interface), a "Cancel" button (e.g., for cancelling the software installation), and/or a "Help" button (e.g., for providing help information associated with the software installation).

Although FIG. 14 shows exemplary elements of user interface 1400, in other implementations, user interface 1400 may contain fewer, different, or additional elements than depicted in FIG. 14.

License Activation User Interfaces

Figure 15:

If an end user selects the check box in activation section 1410 and selects the "Next" button provided in user interface 1400 (e.g., via user device 110), a user interface 1500, as shown in FIG. 15, may be displayed to the end user. As illustrated, user interface 1500 may include a variety of information (e.g., activation type information), such as an activation type selection section 1510, and various navigation mechanisms 1520.

Activation type selection section 1510 may enable the end user to select an activation type for the software installed on the end user's device. For example, activation type selection section 1510 may provide a "Stand-Alone Named User" activation type (e.g., where the software may be installed and activated on one or more devices for used by one person), and a "Designated Computer" activation type (e.g., where the software may be installed on one device for non-simultaneous use by multiple people).

Navigation mechanisms 1520 may include mechanisms (e.g., buttons, icons, links, etc.) that may enable an end user of the software to navigate through the software activation process. For example, in one implementation, navigation mechanisms 1520 may include a "Back" button (e.g., for returning to a previous user interface), a "Next" button (e.g., for moving to a next user interface), a "Cancel" button (e.g., for cancelling the software installation), and/or a "Help" button (e.g., for providing help information associated with the software activation).

Although FIG. 15 shows exemplary elements of user interface 1500, in other implementations, user interface 1500 may contain fewer, different, or additional elements than depicted in FIG. 15.

Figure 16:
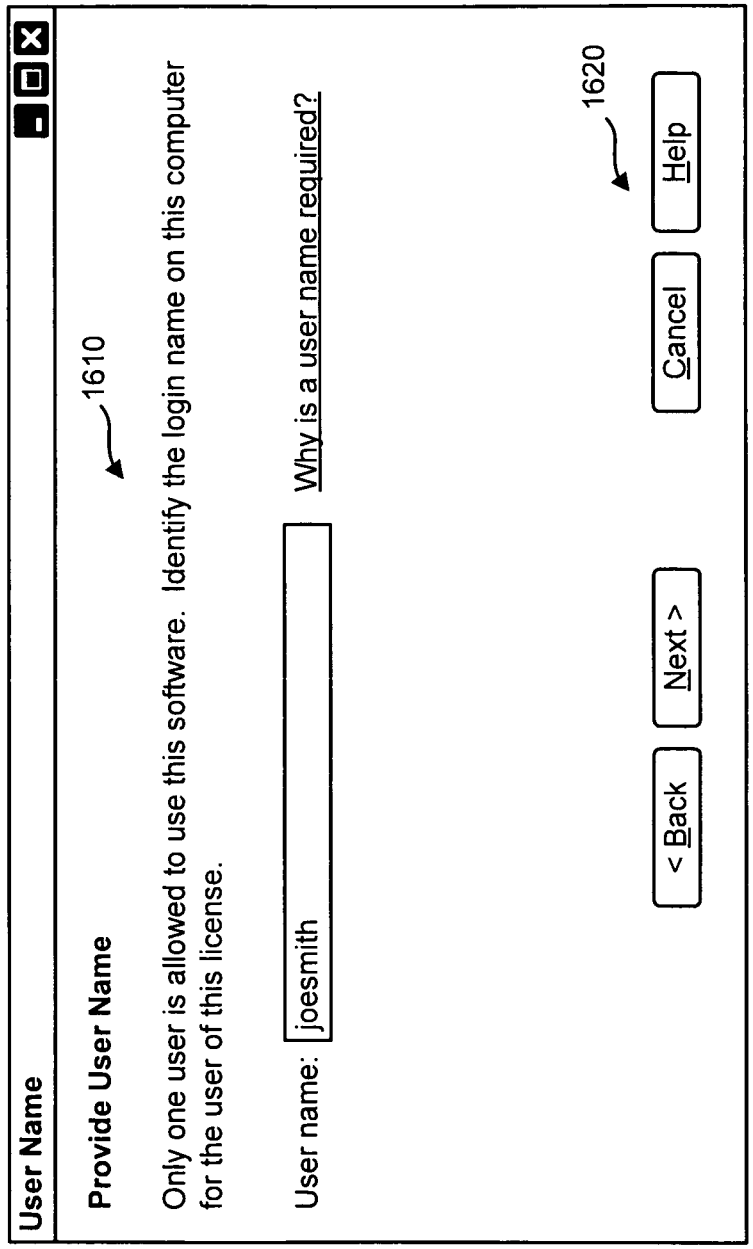

If an end user selects an activation type in activation type selection section 1510 and selects the "Next" button provided in user interface 1500 (e.g., via user device 110), a user interface 1600, as shown in FIG. 16, may be displayed to the end user. As illustrated, user interface 1600 may include a variety of information (e.g., user name information), such as a user name input section 1610, and various navigation mechanisms 1620.

User name input section 1610 may request that the end user identify a login name (e.g., a user name) for the user of the license associated with the software. For example, user name input section 1610 may provide an input field for a user name (e.g., "joesmith") for the user of the license associated with the software.

Navigation mechanisms 1620 may include mechanisms (e.g., buttons, icons, links, etc.) that may enable an end user of the software to navigate through the software activation process. For example, in one implementation, navigation mechanisms 1620 may include a "Back" button (e.g., for returning to a previous user interface), a "Next" button (e.g., for moving to a next user interface), a "Cancel" button (e.g., for cancelling the software installation), and/or a "Help" button (e.g., for providing help information associated with the software activation).

Although FIG. 16 shows exemplary elements of user interface 1600, in other implementations, user interface 1600 may contain fewer, different, or additional elements than depicted in FIG. 16.

Figure 17:
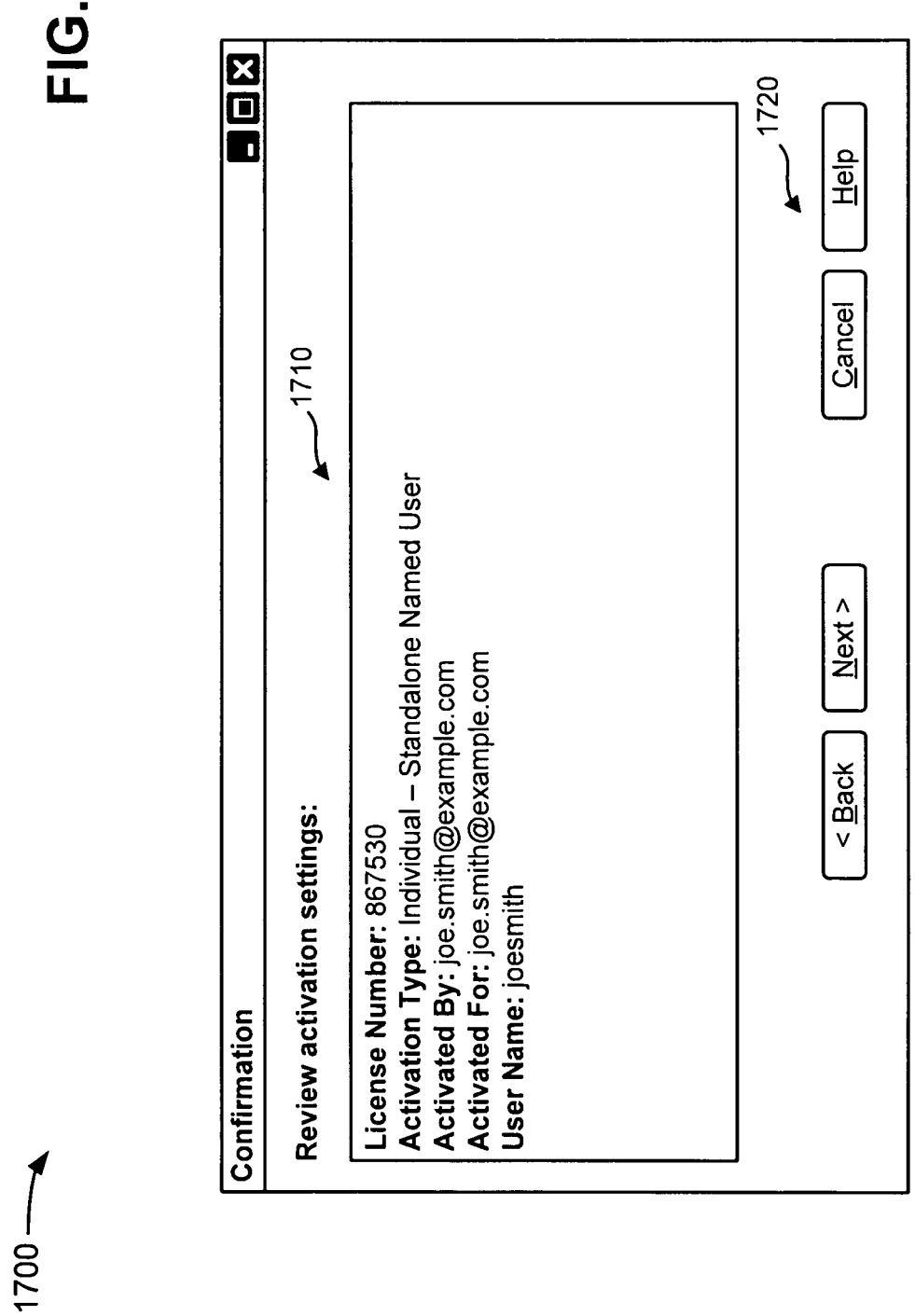

If an end user enters a valid user name in user name input section 1610 and selects the "Next" button provided in user interface 1600 (e.g., via user device 110), a user interface 1700, as shown in FIG. 17, may be displayed to the end user. As illustrated, user interface 1700 may include a variety of information (e.g., confirmation information), such as an activation settings section 1710, and various navigation mechanisms 1720.

Activation settings section 1710 may provide software activation settings information for the end user to confirm. For example, activation settings section 1710 may provide a license number (e.g., "867530"), an activation type (e.g., "Individual—Standalone Named User"), activated by information (e.g., "joe.smith@example.com"), activated for information (e.g., "joe.smith@example.com"), and a user name (e.g., "joesmith").

Navigation mechanisms 1720 may include mechanisms (e.g., buttons, icons, links, etc.) that may enable an end user of the software to navigate through the software activation process. For example, in one implementation, navigation mechanisms 1720 may include a "Back" button (e.g., for returning to a previous user interface), a "Next" button (e.g., for moving to a next user interface), a "Cancel" button (e.g., for cancelling the software installation), and/or a "Help" button (e.g., for providing help information associated with the software installation).

Although FIG. 17 shows exemplary elements of user interface 1700, in other implementations, user interface 1700 may contain fewer, different, or additional elements than depicted in FIG. 17.

Figure 18:
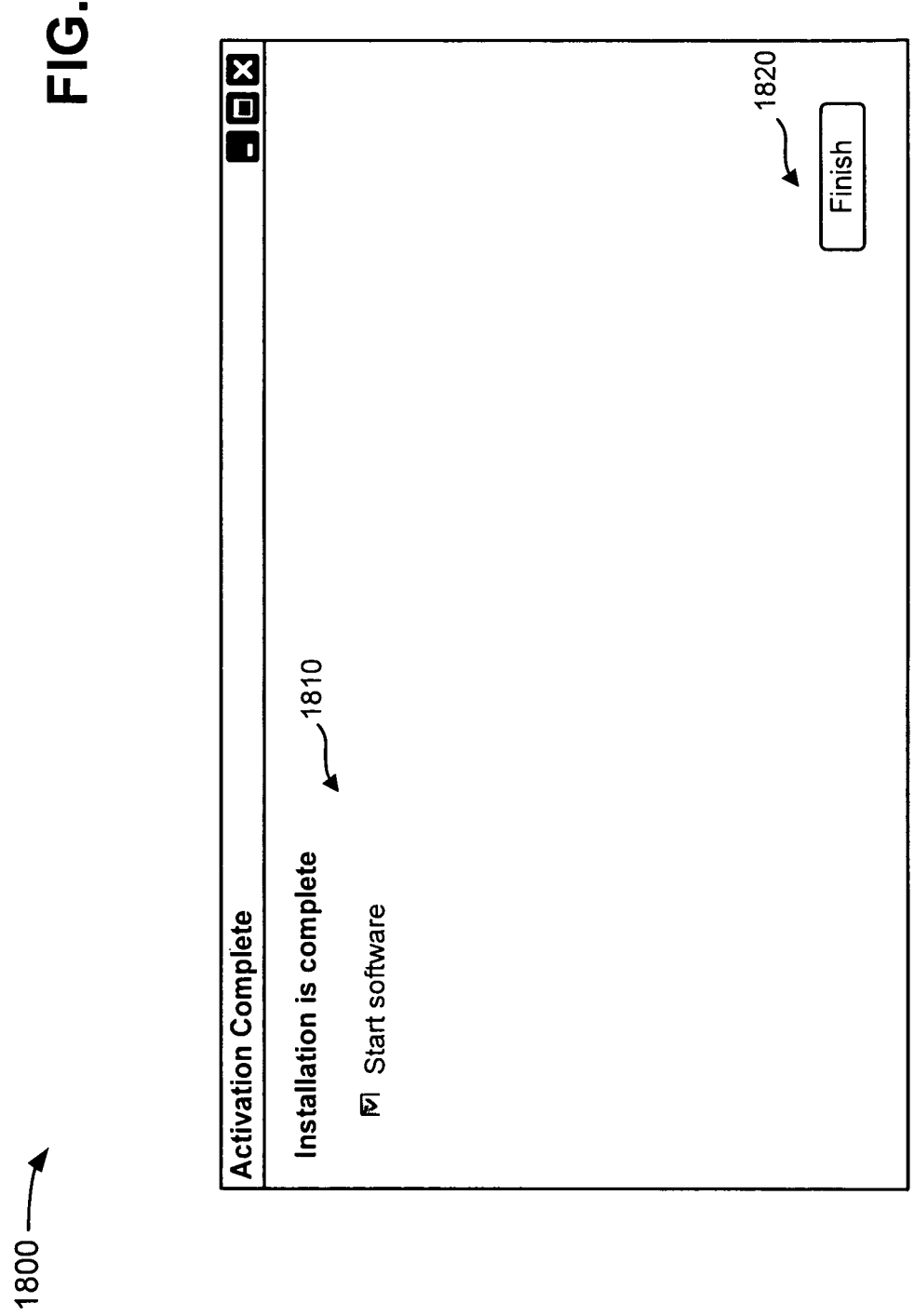

If an end user selects the "Next" button provided in user interface 1700 (e.g., via user device 110), a user interface 1800, as shown in FIG. 18, may be displayed to the end user. As illustrated, user interface 1800 may include a variety of information (e.g., activation complete information), such as a start software section 1810, and a navigation mechanism 1820.

Start software section 1810 may notify the end user that the license activation installation is complete, and may provide the end user with a mechanism (e.g., a check box) to select if the end user wishes to start (e.g., execute) the software.

Navigation mechanism 1820 may include a mechanism (e.g., a button, an icon, a link, etc.) that may enable an end user of the software to navigate through the software activation process. For example, in one implementation, navigation mechanism 1820 may include a "Finish" button (e.g., for completing the activation process and executing the software).

Although FIG. 18 shows exemplary elements of user interface 1800, in other implementations, user interface 1800 may contain fewer, different, or additional elements than depicted in FIG. 18.

License Center User Interfaces

Figure 19:
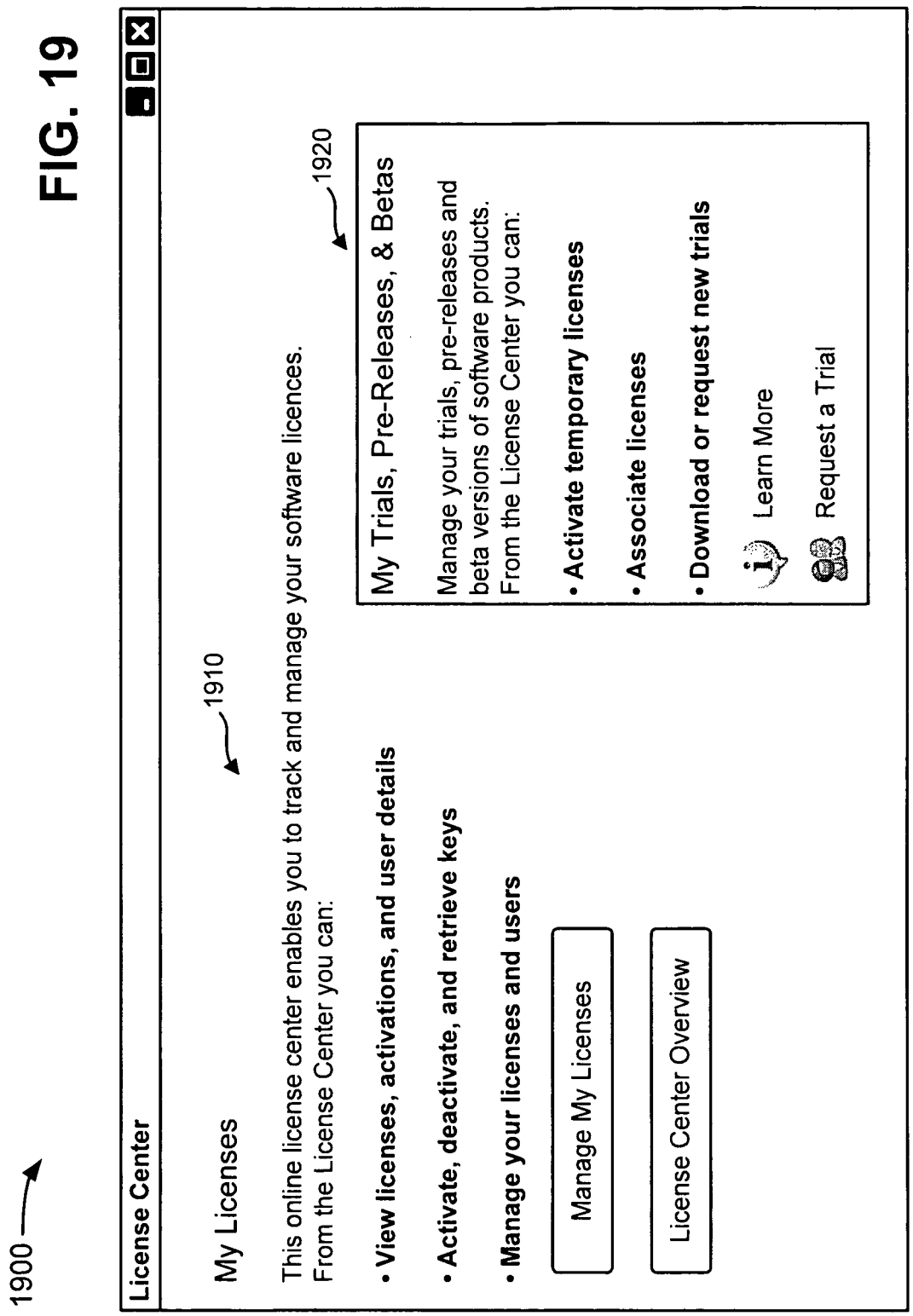

If an administrator logs into license server 120 (e.g., via user device 110), a user interface 1900, as shown in FIG. 19, may be displayed to the administrator. As illustrated, user interface 1900 may include a variety of information (e.g., license management information), such as a license section 1910 and a trials, pre-releases, and betas section 1920.

License section 1910 may include information that permits the administrator to track (e.g., view licenses, activations, and user details, activate, deactivate, and retrieve keys, etc.) and manage software licenses and users. For example, license section 1910 may enable the administrator to select either a "Manage My Licenses" button or a "License Center Overview" button. The license center may permit the administrator to re-designate licenses (e.g., make a change to existing licenses, such as moving software products from one device to another device). For example, from the license center, the administrator may make device changes, may change a set of software products, or any other change (e.g., changing the end user of a license, changing an expiration date of a license, changing an activation type of the license, etc.).

Trials, pre-releases, and betas section 1920 may include information about managing trials, pre-releases, and beta versions of software products. From the license center, the administrator may activate temporary licenses, associate licenses, download or request new trials, etc.

Although FIG. 19 shows exemplary elements of user interface 1900, in other implementations, user interface 1900 may contain fewer, different, or additional elements than depicted in FIG. 19.

If the administrator selects the "Manage My Licenses" button provided in user interface 1900 (e.g., via user device 110), a user interface 2000, as shown in FIG. 20, may be displayed to the administrator. As illustrated, user interface 2000 may include a variety of information (e.g., license management information), such as license manipulation mechanisms 2010, and a license table 2020.

License manipulation mechanisms 2010 may include mechanisms (e.g., buttons, icons, links, etc.) that may enable the administrator to manage license information. For example, in one implementation, license manipulation mechanisms 2010 may include an "Export Table Data" button (e.g., to enable information in license table 2020 to be exported), and an "Associate Me with a License" button (e.g., to enable the administrator to be associated with a license).

License table 2020 may include license information associated with the administrator. For example, license table 2020 may include a license number field (e.g., "12345," "34567", and "24680"), a label field (e.g., "Engineering," "Server," and "Lab"), a license option field (e.g., "Group," "Concurrent," and "Individual"), a use field (e.g., "Standard"), an activation type field (e.g., "Not Set," "Network Concurrent User," and "Designated Computer"), a my role field (e.g., "Administrator," "Asset Manager," and "Manager"), and an administrator field (e.g., "Bob Jones," "Phil Smith," and "Fred Rogers").

Although FIG. 20 shows exemplary elements of user interface 2000, in other implementations, user interface 2000 may contain fewer, different, or additional elements than depicted in FIG. 20.

Figure 21:
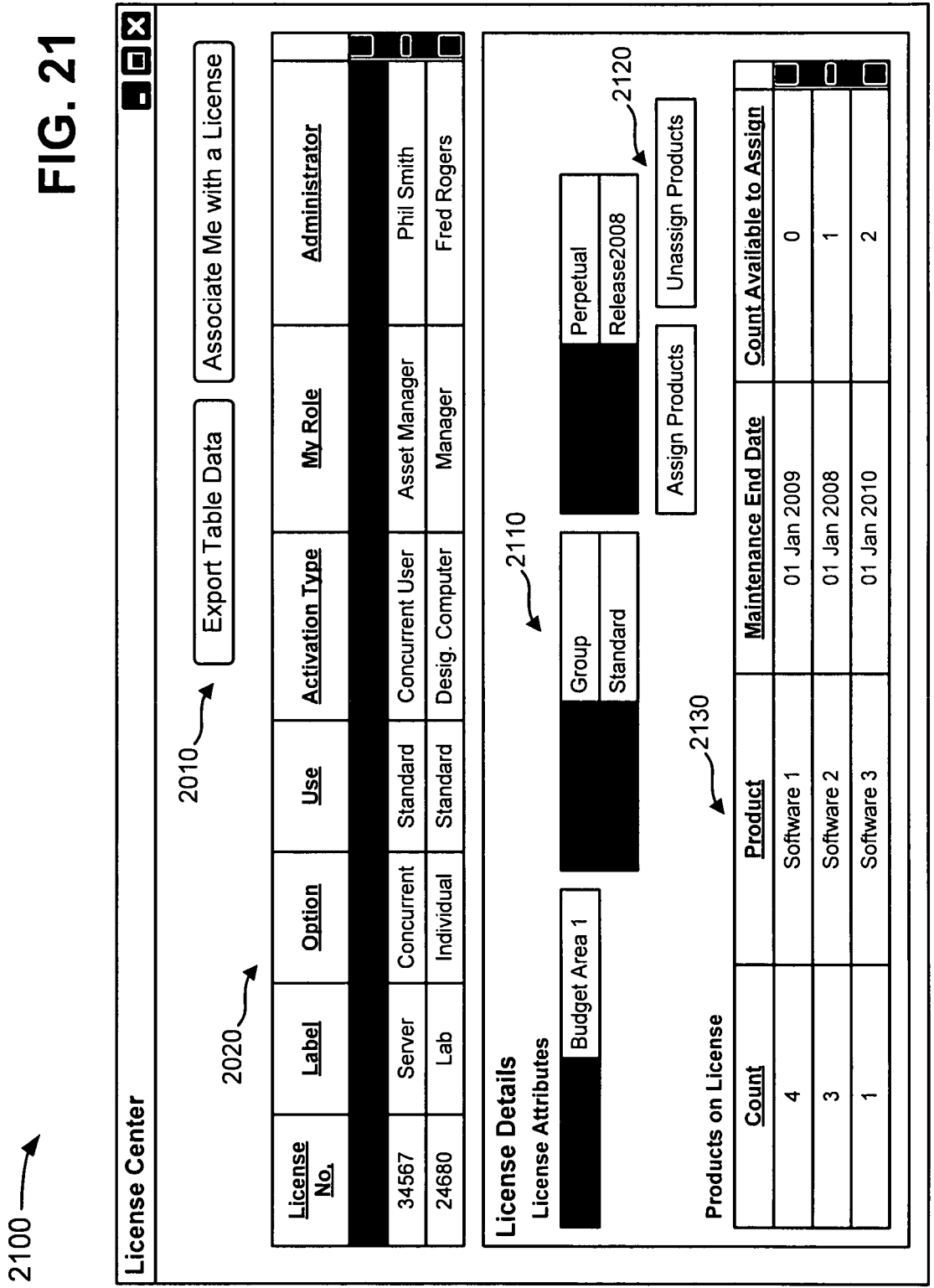

If the administrator selects the "Group" license (i.e., license number "12345") provided in license table 2020 of user interface 2000 (e.g., via user device 110), a user interface 2100, as shown in FIG. 21, may be displayed to the administrator. As illustrated, user interface 2100 may include a variety of information (e.g., license details information), such as a license attributes section 2110, assignment mechanisms 2120, and a products on license section 2130.

License attributes section 2110 may include attribute information associated with the license selected in license table 2020. For example, in one implementation, license attributes section 2110 may include asset group information (e.g., "Budget Area 1"), option information (e.g., "Group"), use information (e.g., "Standard"), term information (e.g., "Perpetual"), and release information (e.g., "Release2008") associated with the license selected in license table 2020.

Assignment mechanisms 2120 may include mechanisms (e.g., buttons, icons, links, etc.) for the administrator to select for assigning or unassigning software products. For example, assignment mechanisms 2120 may include an "Assign Products" button (e.g., to enable the administrator to assign software products to a license), and an "Unassign Products" button (e.g., to enable the administrator to unassign software products from a license).

Products on license section 2130 may include software product information associated with the license selected from license table 2020. For example, products on license section 2130 may include an activation count field (e.g., "4," "3", and "1"), a software product field (e.g., "Software 1," "Software 2," and "Software 3"), a maintenance end date field (e.g., "01 Jan 2009," "01 Jan 2008," and "01 Jan 2010"), and an activation count available to assign field (e.g., "0," "1," and "2").

Although FIG. 21 shows exemplary elements of user interface 2100, in other implementations, user interface 2100 may contain fewer, different, or additional elements than depicted in FIG. 21.

If the administrator selects the "Assign Products" button provided in assignment mechanisms 2120 of user interface 2100 (e.g., via user device 110), a user interface 2200, as shown in FIG. 22, may be displayed to the administrator. As illustrated, user interface 2200 may include a variety of information (e.g., software product assignment information), such as a product assignment selection window 2210.

Product assignment selection window 2210 may include software product information that may be selected for assignment with the license selected in license table 2020. For example, in one implementation, product assignment selection window 2210 may ask the administrator to select one or more software products (e.g., "Software 1," "Software 2," and "Software 3") from a table of software products. The selected software products may be assigned to the license selected in license table 2020. The table of software products may include notes (e.g., "Pre-assigned") associated with the listed software products.

Although FIG. 22 shows exemplary elements of user interface 2200, in other implementations, user interface 2200 may contain fewer, different, or additional elements than depicted in FIG. 22.

If the administrator wishes to set a license file expiration date associated with the newly assigned software products, a user interface 2300, as shown in FIG. 23, may be displayed to the administrator. As illustrated, user interface 2300 may include a variety of information (e.g., license file expiration information), such as a set license file expiration date window 2310.

Set license file expiration date window 2310 may enable the administrator to set an expiration date for the license file associated with the newly assigned software products. If the license file expires, the software associated with the license may no longer function. Set license file expiration date window 2310 may provide the administrator with an option for not setting the expiration date of the license file, and an option for setting a month (e.g., "01 January") and a year (e.g., "2009") for the expiration date of the license file.

Although FIG. 23 shows exemplary elements of user interface 2300, in other implementations, user interface 2300 may contain fewer, different, or additional elements than depicted in FIG. 23.

Figure 24:
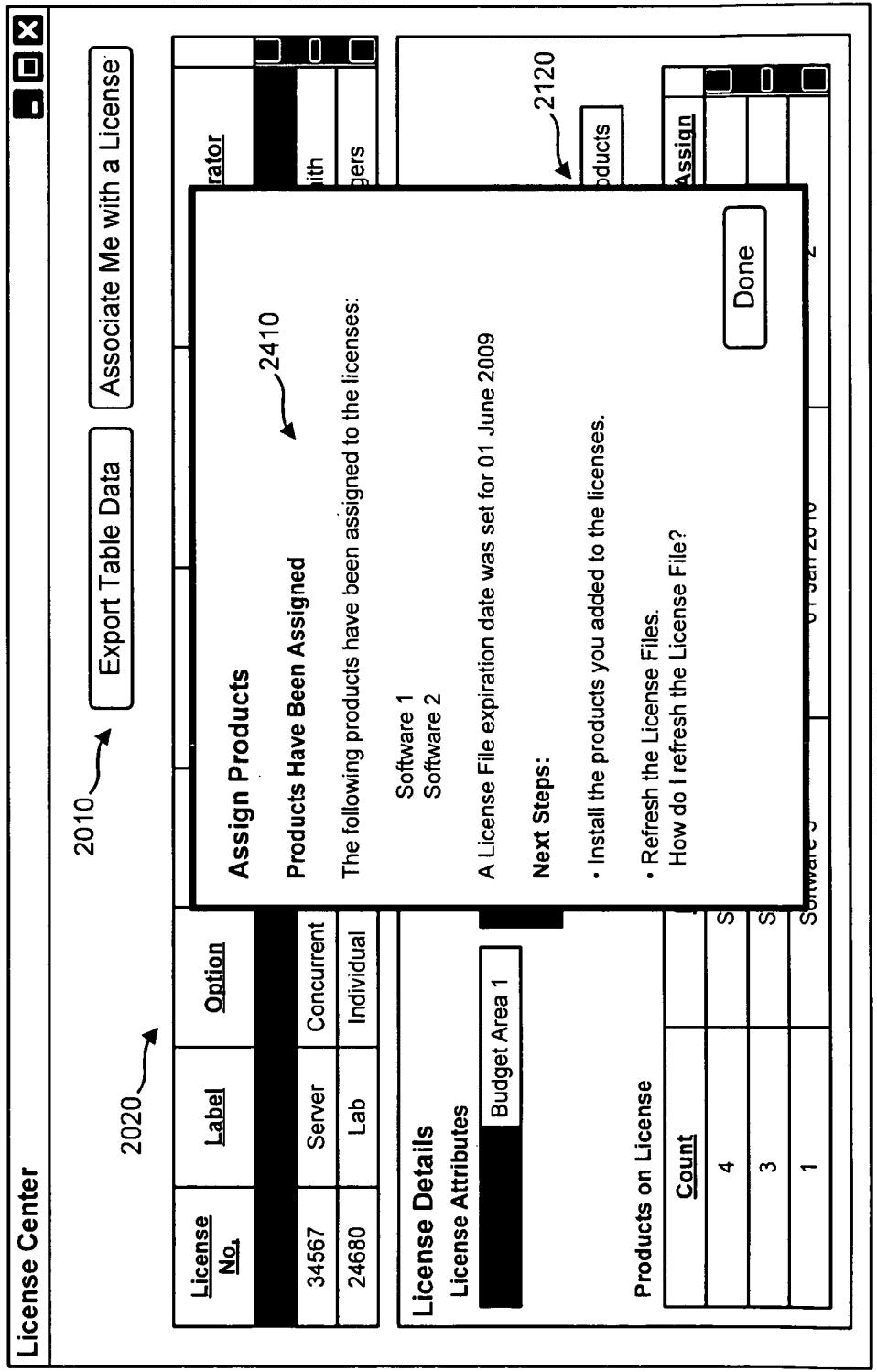

If the license file expiration information is set, a user interface 2400, as shown in FIG. 24, may be displayed to the administrator. As illustrated, user interface 2400 may include a variety of information (e.g., assigned software products information), such as assign products window 2410.

Assign products window 2410 may include information associated with products that have been assigned to the license selected in license table 2020. For example, assign products window 2410 may indicate which software products (e.g., "Software 1" and "Software 2") have been assigned to the license, may provide the license file expiration date (e.g., "1 Jun. 2009"), and may provide other information (e.g., install the products added to licenses, refresh the license files, etc.).

Although FIG. 24 shows exemplary elements of user interface 2400, in other implementations, user interface 2400 may contain fewer, different, or additional elements than depicted in FIG. 24.

If an administrator wishes to manage users and license contacts associated with the license selected in license table 2020, a user interface 2500, as shown in FIG. 25 may be displayed to the administrator. As illustrated, user interface 2500 may include a variety of information (e.g., users and license contacts information), such as a license end users section 2510 and a license contacts section 2520.

License end users section 2510 may include information associated with end users of the license selected in license table 2020. For example, license end users section 2510 may include a first name field (e.g., "Charlie" and "John"), a last name field (e.g., "Brown" and "Smith"), an e-mail address field (e.g., "cbrown@example.com" and "jsmith@example.com"), a permission to download field (e.g., "Allowed"), and permission to activate field (e.g., "Allowed"). License end user section 2510 may also enable the administrator to e-mail end users, add end users, remove end users, and set end user permissions.

License contacts section 2520 may include information associated with contacts of the license selected in license table 2020. For example, license contacts section 2520 may include a first name field (e.g., "Joe" and "Fred"), a last name field (e.g., "Blue" and "Jones"), an e-mail address field (e.g., "jblue@example.com" and "fjones@example.com"), a role field (e.g., "Asset Manager" and "Administrator"), and a department field (e.g., "Development"). License contacts section 2520 may also enable the administrator to edit the license contacts.

Although FIG. 25 shows exemplary elements of user interface 2500, in other implementations, user interface 2500 may contain fewer, different, or additional elements than depicted in FIG. 25.

Exemplary Process

FIGS. 26-29 depict a flow chart of an exemplary process 2600 for activating, deactivating, transferring, validating, designating, re-designating, etc. one or more licenses associated with the one or more software products according to implementations described herein. In one implementation, process 2600 may be performed by license server 120. In another implementation, some or all of process 2600 may be performed by another device or group of devices, including or excluding license server 120.

As illustrated in FIG. 26, process 2600 may begin with receipt of a request to install software (block 2605), determining if a requester of the software installation is authorized (block 2610), and providing software installation information if the software requester is authorized (block 2615). For example, in one implementation described above in connection with FIG. 4, software installation logic 410 of license server 120 may receive software request 310 (e.g., from user device 110 associated with end user 160), may determine if end user 160 is authorized to install the requested software (e.g., via login information, such as a user name and password), and, if end user 160 is authorized, may provide software installation information 320 to user device 110 associated with end user 160.

As further shown in FIG. 26, a request for activation of a license associated with the software may be received (block 2620), a determination may be made if the requester of the license activation is authorized (block 2625), license information may be provided separately from the software installation information if the license requester is authorized (block 2630), and the license associated with the software may be activated (block 2635). For example, in one implementation described above in connection with FIG. 4, license activation logic 420 of license server 120 may receive license activation request 330 (e.g., from user device 110 associated with end user 160), may determine if end user 160 is authorized to activate the license associated with the software (e.g., via login information, such as a user name and password), and, if end user 160 is authorized, may provide license file 340 (e.g., locked to a host identifier associated with licenser server 120) to user device 110 associated with end user 160.

Returning to FIG. 26, a request to view license management information may be received (block 2640), a determination may be made if a requester of the license management information is authorized to view the license management information (block 2645), and the license management information may be provided for display if the requester is authorized (block 2650). For example, in implementations described above in connection with FIGS. 4 and 19, license management logic 430 of license server 120 may receive request 350 to view license management information (e.g., from administrator 150), may determine if administrator 150 is authorized to view the license management information, and, if administrator 150 is authorized, may provide for display (e.g., to user device 110 associated with administrator 150) the license management information, as indicated by reference number 360. In one example, license management logic 430 may provide user interface 1900 (e.g., license center) for display to administrator 150.

As further shown in FIG. 26, a change of the license management information may be enabled (block 2655), and changed license management information may be provided for display (block 2660). For example, in implementations described above in connection with FIGS. 4 and 22, license management logic 430 may enable administrator 150 to change license management information 360, and may provide for display (e.g., to user device 110 associated with administrator 150) the changed license management information. In one example, license management logic 430 may provide user interface 2200 for display to administrator 150.

Process block 2605 may further include the process blocks illustrated in FIG. 27. As shown in FIG. 27, process block 2605 may include launching an installer application (block 2700), and providing for display installer application information (block 2710). For example, in one implementation described above in connection with FIG. 7, if an end user wishes to install software (e.g., via user device 110) provided by license server 120, the end user may send a software request (e.g., software request 310) to license server 120, and user interface 700, as shown in FIG. 7, may be displayed to the end user. As illustrated, user interface 700 may include a variety of information associated with software installation, such as software installer information and installation options 710.

As further shown in FIG. 27, login information may be requested from the software requester (block 2720), and the login information may be validated (block 2730). For example, in one implementation described above in connection with FIG. 9, user interface 900 may include a variety of information (e.g., company account information) associated with the company providing the software (e.g., via license server 120), such as login section 910. Login section 910 may enable the end user to log into a company account associated with the software provided by license server 120. For example, login section 910 may include an input field for an e-mail address, and an input field for a password to verify that the end user has an authorized company account.

Figure 28:
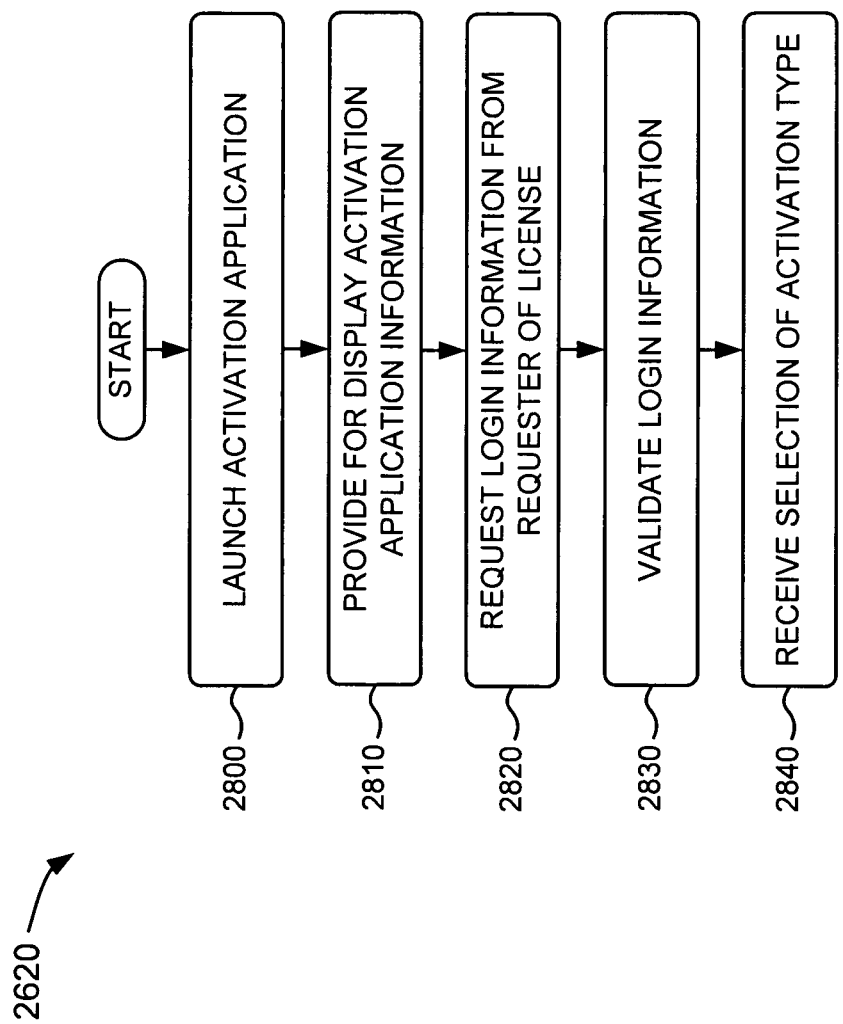

Process block 2620 may further include the process blocks illustrated in FIG. 28. As shown in FIG. 28, process block 2620 may include launching an activation application (block 2800), and providing for display activation application information (block 2810). For example, in one implementation described above in connection with FIG. 15, user interface 1500 may include a variety of information (e.g., activation type information), such as activation type selection section 1510. Activation type selection section 1510 may enable the end user to select an activation type for the software installed on the end user's device.

As further shown in FIG. 28, login information may be requested from the license requester (block 2820), the login information may be validated (block 2830), and selection of an activation type may be received (block 2840). For example, in one implementation, license server 120 may request login information (e.g., a user name and a password) from the license requester, and may validate the login information before activating the license. In another implementation, described above in connection with FIG. 15, user interface 1500 may include a variety of information (e.g., activation type information), such as activation type selection section 1510. Activation type selection section 1510 may enable the end user to select an activation type (e.g., a "Stand-Alone Named User" activation type and a "Designated Computer" activation type) for the software installed on the end user's device. If the end user selects the activation type, this selection may be provided to license server 120.

Figure 29:
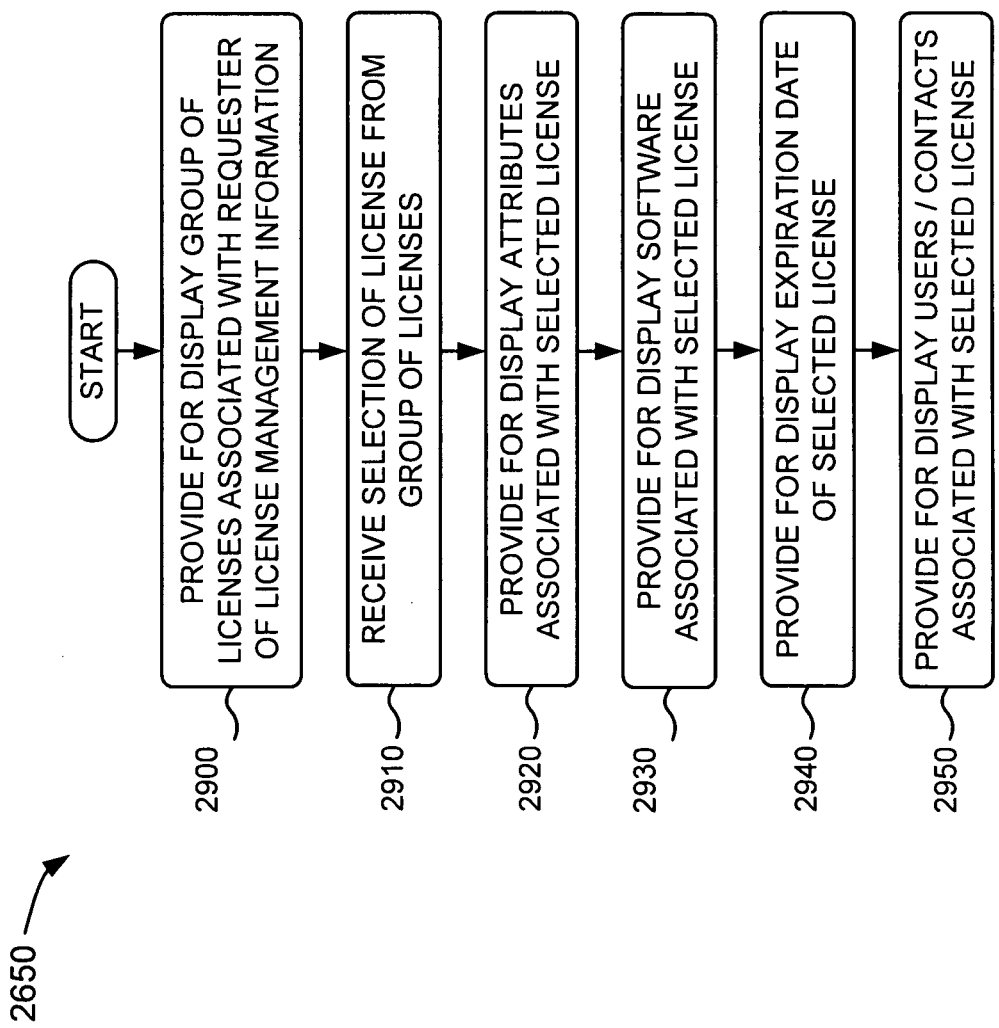

Process block 2650 may further include the process blocks illustrated in FIG. 29. As shown in FIG. 29, process block 2650 may include providing for display a group of licenses associated with the requester of the license management information (block 2900), receiving selection of a license from the group of licenses (block 2910), and providing for display attributes associated with the selected license (block 2920). For example, in implementations described above in connection with FIGS. 20 and 21, user interface 2000 may include a variety of information (e.g., license management information), such as license table 2020. License table 2020 may include license information (e.g., a group of licenses) associated with the administrator. If the administrator selects the "Group" license (i.e., license number "12345") provided in license table 2020 of user interface 2000 (e.g., via user device 110), user interface 2100 may be displayed to the administrator. User interface 2100 may include a variety of information (e.g., license details information), such as a license attributes section 2110. License attributes section 2110 may include attribute information associated with the license selected in license table 2020.

As further shown in FIG. 29, software associated with the selected license may be provided for display (block 2930), an expiration date of the selected license may be provided for display (block 2940), and one or more users and/or one or more contacts associated with the selected license may be provided for display (block 2950). For example, in one implementation described above in connection with FIGS. 21 and 25, user interface 2100 may include products on license section 2130, which may include software product information associated with the license selected from license table 2020. In one example, products on license section 2130 may include maintenance end date field (e.g., "01 Jan 2009," "01 Jan 2008," and "01 Jan 2010"). User interface 2500 may include license end users section 2510 and license contacts section 2520. License end users section 2510 may include information associated with end users of the license selected in license table 2020. License end user section 2510 may also enable the administrator to e-mail end users, add end users, remove end users, and set end user permissions. License contacts section 2520 may include information associated with contacts of the license selected in license table 2020. License contacts section 2520 may also enable the administrator to edit the license contacts.

CONCLUSION

Implementations described herein may include systems and/or methods that provide a license application for one or more software products. For example, the license application may activate, deactivate, transfer, validate, designate, re-designate, etc. one or more licenses associated with the one or more software products. In one implementation, the license application may receive a request to install software, may determine if a requester of the software install is authorized for the software, and may provide installation information for the software if the software requester is authorized. The license application may receive a request for activation of a license for the software, may determine if a requester of the license is authorized, may provide license information, separately from the software installation information, if the license requester is authorized, and may activate the license for the software. The license application may receive a request to view license management information, may determine if a requester of the license management information is authorized, and may provide for display of the license management information if the requester is authorized. The license application may enable the license management information to be changed, and may provide for display of the changed license management information.

The foregoing description of implementations provides illustration and description, but is not intended to be exhaustive or to limit the invention to the precise form disclosed. Modifications and variations are possible in light of the above teachings or may be acquired from practice of the invention. For example, an Appendix, attached herewith at pages 48-127, provides further illustration and description of the invention.

For example, while a series of blocks has been described with regard to FIGS. 26-29, the order of the blocks may be modified in other implementations. Further, non-dependent acts may be performed in parallel.

Also, the term "end user" has been used herein, and is intended to be broadly interpreted to include user devices 110 or an end user of user devices 110.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A method comprising:
 receiving a first request to activate a software product for a first device or a first user,
  the receiving the first request to activate being performed by a server;
 providing, based on the first request and on license information for the software product, permission for a first activation of the software product for the first device or the first user,
  the providing the permission for the first activation being performed by the server;
 receiving, subsequent to the first activation of the software product, a request to validate the first activation of the software product,
  the receiving the request to validate being performed by the server;

validating the first activation of the software product based on the request to validate the first activation,
  the validating the first activation of the software product including verifying that the first device or a user device associated with the first user includes a valid license to the software product, and
  the validating the first activation of the software product being performed by the server;
receiving a second request to activate the software product for a second device or a second user,
  the receiving the second request to activate being performed by the server;
re-designating, based on the second request, the license information,
  the re-designating the license information moving the software product from the first device to the second device,
  the re-designating the license information including changing one or more settings of the license information, and
  the re-designating the license information being performed by the server;
providing, based on the request to validate and the re-designating the license information, permission for a second activation of the software product,
  the providing the permission for the second activation being performed by the server;
deactivating the software product on the first device or for the first user based on providing permission for the second activation of the software product,
  the deactivating the software product being performed by the server; and
updating, based on the providing the permission for the second activation, the license information,
  the updating the license information being performed by the server.

2. The method of claim 1, where providing the permission for the first activation of the software product is performed separately from providing permission to install the software product.

3. The method of claim 1,
where re-designating the license information for the software product includes assigning the license information for the software product for use by an identified user.

4. The method of claim 1, further comprising:
receiving a request to validate the second activation of the software product.

5. The method of claim 1, where updating the license information for the software product is performed based on satisfaction of pre-defined rules.

6. The method of claim 1, further comprising:
validating an activation key received by the server in order to provide the permission for the first activation of the software product.

7. The method of claim 1, where the server is maintained by a publisher of the software product.

8. The method of claim 1, where the request to validate the first activation of the software product is generated automatically by the software product.

9. The method of claim 1, where the request to validate the first activation of the software product is generated periodically by the software product.

10. The method of claim 1, where the updating the license information includes updating an expiration date for the license information.

11. The method of claim 1, further comprising:
receiving a request to deactivate the software product; and
deactivating the software product on the first device based on receiving the request to deactivate the software product.

12. The method of claim 11, further comprising:
modifying the license information for the software product to indicate that an additional copy of the license for the software product is available for activation.

13. The method of claim 1, where the license information includes a license type that comprises one of:
an individual license associated with one of a designated computing device or an identified user; or
a group license associated with one of two or more designated computing devices or two or more identified users.

14. The method of claim 13, where, for the individual license, the one of the designated computing device or the identified user is defined via one of:
during installation of the software product,
during activation of the software product, or
by an input provided by an administrator.

15. The method of claim 13, further comprising:
associating the individual license with the one of the designated computing device or the identified user.

16. The method of claim 1, further comprising:
receiving a request, from the first user device, to view the license information;
determining whether a user of the first device is authorized to view the license information;
providing for display the license information to first device when the user is authorized to view the license information;
enabling the license information to be changed by the user in order to generate changed license information; and
providing for display the changed license information to the first device.

17. The method of claim 16, where the user is associated with a license administrator.

18. The method of claim 16, where the changed license information includes information associated with at least one of:
switching a license for the software product from the first device to the second device;
setting an expiration date for the license;
associating another user with the license; or
deactivating the software product installed on the first device.

19. The method of claim 18, where the changed license information includes information associated with:
updating the license information at the first device based on receiving a second request to validate the second activation of the software product.

20. The method of claim 1, where the software product comprises a technical computing environment.

21. One or more non-transitory computer-readable media storing instructions, the instructions comprising:
one or more instructions that, when executed by one or more processors, cause the one or more processors to:
receive a request to install software on a first device or a user device associated with a first user;
provide software installation information when the first device or the first user is authorized for installation of the software;
receive a first request for activation of a license associated with the software for the first device or the first user;

provide license information when the first device or the first user is authorized for activation of the license;

activate the license associated with the software, for the first device or the first user, when the first device or the first user is authorized for activation of the license, the license being activated based on the license information;

receive a request to validate activation of the software;

validate the activation of the software, based on the request to validate the activation of the software, by verifying that the first device or the user device associated with the first user includes a valid copy of the software;

receive a second request for activation of the license associated with the software for a second device or a second user;

re-designate the license information based on the second request, the one or more instructions, that cause the re-designating the license information, further causing the one or more processors to move the software from the first device to the second device;

activate, based on the request to validate and the re-designated license information, the license associated with the software, for the second device or the second user; and deactivate the software on the first device or for the first user based on activating the license associated with the software for the second device or the second user.

22. The one or more non-transitory computer-readable media of claim 21, where the instructions further comprise:
one or more instructions that, when executed by the one or more processors, cause the one or more processors to:
provide a key for software installation via the software installation information.

23. The one or more non-transitory computer-readable media of claim 21, where the instructions further comprise:
one or more instructions that, when executed by the one or more processors, cause the one or more processors to:
cause the second device to execute an installer application;
request login information from a user of the second device via the installer application;
receive the login information from the second device; and
authorize the user of the second device for installation of the software on the second device based on the login information.

24. The one or more non-transitory computer-readable media of claim 21, where the instructions further comprise:
one or more instructions that, when executed by the one or more processors, cause the one or more processors to:
launch an activation application;
cause information associated with the activation application to be displayed via the first device;
request login information from a user of the first device via the information associated with the activation application;
receive the login information from the first device;
validate the login information;
authorize the user of the first device for activation of the license when the login information is validated;
receive a selection of a license activation type when the user of the first device is authorized for activation of the license;
activate the license associated with the software based on the license activation type when the user of the first device is authorized for activation of the license; and
activate the software based on the license activation type when the user of the first device is authorized for activation of the license.

25. The one or more non-transitory computer-readable media of claim 24, where the license activation type comprises one of:
an individual license associated with one of the first device or the user of the first device; or
a group license associated with one of two or more designated computing devices, including the first device, or two or more identified users of the first device.

26. The one or more non-transitory computer-readable media of claim 25, where the first device or the user of the first device is identified via one of:
during installation of the software,
during activation of the software, or
by an input provided by an administrator.

27. The one or more non-transitory computer-readable media of claim 21, where the instructions further comprise:
one or more instructions that, when executed by the one or more processors, cause the one or more processors to:
receive, from the first device, a request to view the license information;
determine whether a user of the first device is authorized to view the license information;
provide for display the license information to the first device when the user of the first device is authorized to view the license information;
enable the license information to be changed by the user of the first device in order to generate changed license information; and
provide for display the changed license information to the first device.

28. The one or more non-transitory computer-readable media of claim 27, where the instructions further comprise:
one or more instructions that, when executed by the one or more processors, cause the one or more processors to:
provide for display a group of licenses, associated with the user of the first device, the first device;
receive selection of a particular license from the group of licenses; and
provide for display, to the first device, at least one of:
attributes associated with the particular license,
information identifying software associated with the particular license,
an expiration date associated with the particular license,
user information associated with the particular license, or
contact information associated with the particular license.

29. The one or more non-transitory computer-readable media of claim 28, where the changed license information includes information associated with at least one of:
switching the particular license from a first computing device to a second computing device;
setting expiration dates for the group of licenses;

associating a particular user with the particular license;
removing an association of the user with the particular license; or
deactivating the first computing device associated with the particular license.

30. A system, comprising:
one or more server devices, comprising one or more processors, to:
   receive a request to install software on a first device or a user device associated with a first user,
   determine if the first device or the first user is authorized for installation of the software;
   provide software installation information to the first device or the user device associated with the first user when the first device or the first user is authorized for installation of the software;
   receive a first request for activation of a license associated with the software;
   determine, based on license information, whether the first device or the first user is authorized for the activation of the license;
   activate the license associated with the software when the first device or the first user is authorized for the activation of the license;
   receive a request to validate the activation of the software on the first device or the user device associated with the first user,
   validate the activation of the software, based on a request to validate the activation of the software, by verifying that the first device or the user device associated with the first user includes a valid license to the software;
   receive a second request for activation of the license associated with the software for a second device or a second user;
   re-designate the license information based on the second request,
   the one or more server devices, when re-designating the license information, are to move the software from the first device to the second device;
   activate, based on the request to validate and the re-designated license information, the license associated with the software, for the second device or the second user; and
   deactivate the software on the first device or for the first user based on activating the license associated with the software for the second device or the second user.

31. The one or more non-transitory computer-readable media of claim 21, where the software comprises a technical computing environment.

32. The system of claim 30, where the one or more server devices are further to:
   receive, from the first device, a request to view the license information;
   determine whether a user of the first device is authorized to view the license information;
   provide for display the license information to the first device when the user of the first device is authorized to view the license information;
   enable the license information to be changed by the user of the first device in order to generate changed license information; and
   provide for display the changed license information to the first device.

33. The method of claim 1, further comprising:
   receiving, subsequent to providing the permission for the second activation of the software product, another request to validate the first activation of the software product for the first device or the first user; and
   where the software product is deactivated on the first device or for the first user based on receiving the other request to validate.

* * * * *